United States Patent
Leather et al.

(10) Patent No.: US 6,707,458 B1
(45) Date of Patent: Mar. 16, 2004

(54) METHOD AND APPARATUS FOR TEXTURE TILING IN A GRAPHICS SYSTEM

(75) Inventors: Mark M. Leather, Saratoga, CA (US); Yoshitaka Yasumoto, Osaka (JP)

(73) Assignee: Nintendo Co., Ltd., Kyoto (JP)

( * ) Notice: Subject to any disclaimer, the term of this patent is extended or adjusted under 35 U.S.C. 154(b) by 321 days.

(21) Appl. No.: 09/726,221

(22) Filed: Nov. 28, 2000

Related U.S. Application Data

(60) Provisional application No. 60/227,033, filed on Aug. 23, 2000.

(51) Int. Cl.[7] .................................................. G09G 5/00
(52) U.S. Cl. ...................... 345/582; 345/583; 345/629; 345/630
(58) Field of Search ................................ 345/582, 583, 345/629, 630

(56) References Cited

U.S. PATENT DOCUMENTS

| | | |
|---|---|---|
| 4,275,413 A | 6/1981 | Sakamoto et al. |
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,491,836 A | 1/1985 | Collmeyer et al. |
| 4,570,233 A | 2/1986 | Yan et al. |
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,653,012 A | 3/1987 | Duffy et al. |
| 4,658,247 A | 4/1987 | Gharachorloo |
| 4,692,880 A | 9/1987 | Merz et al. |
| 4,695,943 A | 9/1987 | Keeley et al. |
| 4,710,876 A | 12/1987 | Cline et al. |
| 4,725,831 A | 2/1988 | Coleman |

(List continued on next page.)

FOREIGN PATENT DOCUMENTS

| | | |
|---|---|---|
| CA | 2070934 | 12/1993 |
| EP | 0 637 813 A2 | 2/1995 |
| EP | 1 074 945 | 2/2001 |

(List continued on next page.)

OTHER PUBLICATIONS

GDC 2000: Advanced OpenGL Game Development, "A Practical and Robust Bump–mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addresing," Sim Dietrich, Jan. 6, 2000, www.nvidia.com.

(List continued on next page.)

Primary Examiner—Matthew C. Bella
Assistant Examiner—Tam Tran
(74) Attorney, Agent, or Firm—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. Textured surfaces are created using indirect texture tiling. A set of direct and indirect texture coordinates are defined. The indirect coordinates are used in an indirect lookup operation in an indirect tile index map to obtain tile select offsets. The offsets are used to modify the direct texture coordinates, and the modified texture coordinates are then used to obtain a texture tile from a tile definitions map. The selected tile is then displayed. In another embodiment, the offsets are biased and combined with the direct texture coordinates to produce a second set of modified texture coordinates. The second set is used to obtain a second texture tile from the tile definitions map. The two selected tiles are then blended together to provide a synthetic texture tile having a pseudo-3D effect.

6 Claims, 37 Drawing Sheets

U.S. PATENT DOCUMENTS

| | | |
|---|---|---|
| 4,768,148 A | 8/1988 | Keeley et al. |
| 4,785,395 A | 11/1988 | Keeley |
| 4,790,025 A | 12/1988 | Inoue et al. |
| 4,808,988 A | 2/1989 | Burke et al. |
| 4,812,988 A | 3/1989 | Duthuit et al. |
| 4,817,175 A | 3/1989 | Tenenbaum et al. |
| 4,829,295 A | 5/1989 | Hiroyuki |
| 4,829,452 A | 5/1989 | Kang et al. |
| 4,833,601 A | 5/1989 | Barlow et al. |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,965,751 A | 10/1990 | Thayer et al. |
| 4,974,176 A | 11/1990 | Buchner et al. |
| 4,974,177 A | 11/1990 | Nishiguchi |
| 4,975,977 A | 12/1990 | Kurosu et al. |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,056,044 A | 10/1991 | Frederickson et al. |
| 5,062,057 A | 10/1991 | Blacken et al. |
| 5,086,495 A | 2/1992 | Gray et al. |
| 5,091,967 A | 2/1992 | Ohsawa |
| 5,097,427 A | 3/1992 | Lathrop et al. |
| 5,136,664 A | 8/1992 | Bersack et al. |
| 5,144,291 A | 9/1992 | Nishizawa |
| 5,163,126 A | 11/1992 | Einkauf et al. |
| 5,170,468 A | 12/1992 | Shah et al. |
| 5,179,638 A | 1/1993 | Dawson et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,586,234 A | 12/1996 | Sakuraba et al. |
| 5,593,350 A | 1/1997 | Bouton et al. |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,687,357 A | 11/1997 | Priem |
| 5,691,746 A | 11/1997 | Shyu |
| 5,694,143 A | 12/1997 | Fielder et al. |
| 5,696,892 A | 12/1997 | Redmann et al. |
| 5,701,444 A | 12/1997 | Baldwin |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,721,947 A | 2/1998 | Priem et al. |
| 5,724,561 A | 3/1998 | Tarolli et al. |
| 5,726,689 A | 3/1998 | Negishi et al. |
| 5,726,947 A | 3/1998 | Yamazaki et al. |
| 5,727,192 A | 3/1998 | Baldwin |
| 5,734,386 A | 3/1998 | Cosman |
| 5,739,819 A | 4/1998 | Bar-Nahum |
| 5,740,343 A | 4/1998 | Tarolli et al. |

| | | |
|---|---|---|
| 5,740,383 A | 4/1998 | Nally et al. |
| 5,740,406 A | 4/1998 | Rosenthal et al. |
| 5,742,749 A | 4/1998 | Foran et al. |
| 5,742,788 A | 4/1998 | Priem et al. |
| 5,745,118 A | 4/1998 | Alcorn et al. |
| 5,745,125 A | 4/1998 | Deering et al. |
| 5,748,199 A | 5/1998 | Palm |
| 5,748,986 A | 5/1998 | Butterfield et al. |
| 5,751,291 A | 5/1998 | Olsen et al. |
| 5,751,292 A | 5/1998 | Emmot |
| 5,751,295 A | 5/1998 | Becklund et al. |
| 5,751,930 A | 5/1998 | Katsura et al. |
| 5,754,191 A | 5/1998 | Mills et al. |
| 5,757,382 A | 5/1998 | Lee |
| 5,758,182 A | 5/1998 | Rosenthal et al. |
| 5,760,783 A | 6/1998 | Migdal et al. |
| 5,764,228 A | 6/1998 | Baldwin |
| 5,764,237 A | 6/1998 | Kaneko |
| 5,764,243 A | 6/1998 | Baldwin |
| 5,767,856 A | 6/1998 | Peterson et al. |
| 5,767,858 A | 6/1998 | Kawase et al. |
| 5,768,626 A | 6/1998 | Munson et al. |
| 5,768,629 A | 6/1998 | Wise et al. |
| 5,774,133 A | 6/1998 | Neave et al. |
| 5,777,623 A | 7/1998 | Small |
| 5,777,629 A | 7/1998 | Baldwin |
| 5,781,927 A | 7/1998 | Wu et al. |
| 5,791,994 A | 8/1998 | Hirano et al. |
| 5,798,770 A | 8/1998 | Baldwin |
| 5,801,706 A | 9/1998 | Fujita et al. |
| 5,801,711 A | 9/1998 | Koss et al. |
| 5,801,716 A | 9/1998 | Silverbrook |
| 5,801,720 A | 9/1998 | Norrod et al. |
| 5,805,175 A | 9/1998 | Priem |
| 5,805,868 A | 9/1998 | Murphy |
| 5,808,619 A | 9/1998 | Choi et al. |
| 5,808,630 A | 9/1998 | Pannell |
| 5,809,219 A | 9/1998 | Pearce et al. |
| 5,809,278 A | 9/1998 | Watanabe et al. |
| 5,815,165 A | 9/1998 | Blixt |
| 5,815,166 A | 9/1998 | Baldwin |
| 5,818,456 A | 10/1998 | Cosman et al. |
| 5,819,017 A | 10/1998 | Akeley et al. |
| 5,821,940 A | 10/1998 | Morgan et al. |
| 5,821,949 A | 10/1998 | Deering |
| 5,822,516 A | 10/1998 | Krech, Jr. |
| 5,828,382 A | 10/1998 | Wilde |
| 5,828,383 A | 10/1998 | May et al. |
| 5,828,907 A | 10/1998 | Wise et al. |
| 5,831,624 A | 11/1998 | Tarolli et al. |
| 5,831,625 A | 11/1998 | Rich et al. |
| 5,831,640 A | 11/1998 | Wang et al. |
| 5,835,096 A | 11/1998 | Baldwin |
| 5,835,792 A | 11/1998 | Wise et al. |
| 5,838,334 A | 11/1998 | Dye |
| 5,844,576 A | 12/1998 | Wilde et al. |
| 5,850,229 A | 12/1998 | Edelsbrunner et al. |
| 5,852,451 A | 12/1998 | Cox et al. |
| 5,856,829 A | 1/1999 | Gray, III et al. |
| 5,859,645 A | 1/1999 | Latham |
| 5,861,888 A | 1/1999 | Dempsey |
| 5,861,893 A | 1/1999 | Strugess |
| 5,867,166 A | 2/1999 | Myhrvold et al. |
| 5,870,097 A | 2/1999 | Snyder et al. |
| 5,870,098 A | 2/1999 | Gardiner |
| 5,870,102 A | 2/1999 | Tarolli et al. |
| 5,870,109 A | 2/1999 | McCormack et al. |
| 5,870,587 A | 2/1999 | Danforth et al. |
| 5,872,902 A | 2/1999 | Kuchkuda et al. |
| 5,874,969 A | 2/1999 | Storm et al. |
| 5,877,741 A | 3/1999 | Chee et al. |
| 5,877,770 A | 3/1999 | Hanaoka |
| 5,877,771 A | 3/1999 | Drebin et al. |
| 5,880,736 A | 3/1999 | Peercy et al. |
| 5,880,737 A | 3/1999 | Griffen et al. |
| 5,883,638 A | 3/1999 | Rouet et al. |
| 5,886,701 A | 3/1999 | Chauvin et al. |
| 5,886,705 A | 3/1999 | Lentz |
| 5,887,155 A | 3/1999 | Laidig |
| 5,890,190 A | 3/1999 | Rutman |
| 5,892,517 A | 4/1999 | Rich |
| 5,892,974 A | 4/1999 | Koizumi et al. |
| 5,894,300 A | 4/1999 | Takizawa |
| 5,900,881 A | 5/1999 | Ikedo |
| 5,903,283 A | 5/1999 | Selwan et al. |
| 5,909,218 A | 6/1999 | Naka et al. |
| 5,909,225 A | 6/1999 | Schinnerer et al. |
| 5,912,675 A | 6/1999 | Laperriere |
| 5,912,676 A | 6/1999 | Malladi et al. |
| 5,914,721 A | 6/1999 | Lim |
| 5,914,725 A | 6/1999 | McInnis et al. |
| 5,914,729 A | 6/1999 | Lippincott |
| 5,917,496 A | 6/1999 | Fujita et al. |
| 5,920,326 A | 7/1999 | Rentschler et al. |
| 5,920,876 A | 7/1999 | Ungar et al. |
| 5,923,332 A | 7/1999 | Izawa |
| 5,923,334 A | 7/1999 | Luken |
| 5,926,182 A | 7/1999 | Menon et al. |
| 5,926,647 A | 7/1999 | Adams et al. |
| 5,933,150 A | 8/1999 | Ngo et al. |
| 5,933,154 A | 8/1999 | Howard et al. |
| 5,933,155 A | 8/1999 | Akeley |
| 5,933,529 A | 8/1999 | Kim |
| 5,936,641 A | 8/1999 | Jain et al. |
| 5,936,683 A | 8/1999 | Lin |
| 5,940,086 A | 8/1999 | Rentschler et al. |
| 5,940,089 A | 8/1999 | Dilliplane et al. |
| 5,940,538 A | 8/1999 | Spiegel et al. |
| 5,943,058 A | 8/1999 | Nagy |
| 5,943,060 A | 8/1999 | Cosman et al. |
| 5,945,997 A | 8/1999 | Zhao et al. |
| 5,949,421 A | 9/1999 | Ogletree et al. |
| 5,949,423 A | 9/1999 | Olsen |
| 5,949,424 A | 9/1999 | Cabral et al. |
| 5,949,428 A | 9/1999 | Toelle et al. |
| 5,949,440 A | 9/1999 | Krech, Jr. et al. |
| 5,956,042 A | 9/1999 | Tucker et al. |
| 5,956,043 A | 9/1999 | Jensen |
| 5,958,020 A | 9/1999 | Evoy et al. |
| 5,959,640 A | 9/1999 | Rudin et al. |
| 5,963,220 A | 10/1999 | Lee et al. |
| 5,966,134 A | 10/1999 | Arias |
| 5,969,726 A | 10/1999 | Rentschler et al. |
| 5,977,979 A | 11/1999 | Clough et al. |
| 5,977,984 A | 11/1999 | Omori |
| 5,982,376 A | 11/1999 | Abe et al. |
| 5,982,390 A | 11/1999 | Stoneking et al. |
| 5,986,659 A | 11/1999 | Gallery et al. |
| 5,986,663 A | 11/1999 | Wilde |
| 5,986,677 A | 11/1999 | Jones et al. |
| 5,987,567 A | 11/1999 | Rivard et al. |
| 5,990,903 A | 11/1999 | Donovan |
| 5,995,120 A | 11/1999 | Dye |
| 5,995,121 A | 11/1999 | Alcorn et al. |
| 5,999,189 A | 12/1999 | Kajiya et al. |
| 5,999,196 A | 12/1999 | Storm et al. |
| 5,999,198 A | 12/1999 | Horan et al. |
| 6,002,407 A | 12/1999 | Fadden |
| 6,002,409 A | 12/1999 | Harkin |
| 6,002,410 A | 12/1999 | Battle |
| 6,005,582 A | 12/1999 | Gabriel et al. |
| 6,005,583 A | 12/1999 | Morrison |

| | | |
|---|---|---|
| 6,005,584 A | 12/1999 | Kitamura et al. |
| 6,007,428 A | 12/1999 | Nishiumi et al. |
| 6,008,820 A | 12/1999 | Chauvin et al. |
| 6,011,562 A | 1/2000 | Gagne et al. |
| 6,011,565 A | 1/2000 | Kuo et al. |
| 6,014,144 A | 1/2000 | Nelson et al. |
| 6,016,150 A | 1/2000 | Lengyel et al. |
| 6,016,151 A | 1/2000 | Lin |
| 6,018,350 A | 1/2000 | Lee et al. |
| 6,020,931 A | 2/2000 | Bilbrey et al. |
| 6,021,417 A | 2/2000 | Massarksy |
| 6,022,274 A | 2/2000 | Takeda et al. |
| 6,023,261 A | 2/2000 | Ugajin |
| 6,023,738 A | 2/2000 | Priem et al. |
| 6,025,853 A | 2/2000 | Baldwin |
| 6,026,182 A | 2/2000 | Lee et al. |
| 6,028,608 A | 2/2000 | Jenkins |
| 6,028,611 A | 2/2000 | Anderson et al. |
| 6,031,542 A | 2/2000 | Wittig |
| 6,035,360 A | 3/2000 | Doidge et al. |
| 6,037,948 A | 3/2000 | Liepa |
| 6,037,949 A | 3/2000 | DeRose et al. |
| 6,038,031 A | 3/2000 | Murphy |
| 6,038,348 A | 3/2000 | Carley |
| 6,040,843 A | 3/2000 | Monroe et al. |
| 6,040,844 A | 3/2000 | Yamaguchi et al. |
| 6,041,010 A | 3/2000 | Puar et al. |
| 6,043,804 A | 3/2000 | Greene |
| 6,043,821 A | 3/2000 | Sprague et al. |
| 6,046,746 A | 4/2000 | Deering |
| 6,046,747 A | 4/2000 | Saunders et al. |
| 6,046,752 A | 4/2000 | Kirkland et al. |
| 6,049,337 A | 4/2000 | Van Overveld |
| 6,049,338 A | 4/2000 | Anderson et al. |
| 6,052,125 A | 4/2000 | Gardiner et al. |
| 6,052,126 A | 4/2000 | Sakuraba et al. |
| 6,052,127 A | 4/2000 | Vaswani et al. |
| 6,052,129 A | 4/2000 | Fowler et al. |
| 6,052,133 A | 4/2000 | Kang |
| 6,054,993 A | 4/2000 | Devic et al. |
| 6,054,999 A | 4/2000 | Strandberg |
| 6,057,847 A | 5/2000 | Jenkins |
| 6,057,849 A | 5/2000 | Haubner et al. |
| 6,057,851 A | 5/2000 | Luken et al. |
| 6,057,852 A | 5/2000 | Krech, Jr. |
| 6,057,859 A | 5/2000 | Handelman et al. |
| 6,057,861 A | 5/2000 | Lee et al. |
| 6,057,862 A | 5/2000 | Margulis |
| 6,057,863 A | 5/2000 | Olarig |
| 6,061,462 A | 5/2000 | Tostevin et al. |
| 6,064,392 A | 5/2000 | Rohner |
| 6,067,098 A | 5/2000 | Dye |
| 6,070,204 A | 5/2000 | Poisner |
| 6,072,496 A | 6/2000 | Guenter et al. |
| 6,075,543 A | 6/2000 | Akeley |
| 6,075,546 A | 6/2000 | Hussain et al. |
| 6,078,311 A | 6/2000 | Pelkey |
| 6,078,333 A | 6/2000 | Wittig et al. |
| 6,078,334 A | 6/2000 | Hanaoka et al. |
| 6,078,338 A | 6/2000 | Horan et al. |
| 6,081,274 A | 6/2000 | Shiraishi |
| 6,088,035 A | 7/2000 | Sudarsky et al. |
| 6,088,042 A | 7/2000 | Handelman et al. |
| 6,088,487 A | 7/2000 | Kurashige |
| 6,088,701 A | 7/2000 | Whaley et al. |
| 6,091,431 A | 7/2000 | Saxena et al. |
| 6,092,124 A | 7/2000 | Priem et al. |
| 6,092,158 A | 7/2000 | Harriman et al. |
| 6,094,200 A | 7/2000 | Olsen et al. |
| 6,097,435 A | 8/2000 | Stanger et al. |
| 6,097,437 A | 8/2000 | Hwang |
| 6,104,415 A | 8/2000 | Gossett |
| 6,104,417 A | 8/2000 | Nielsen et al. |
| 6,105,094 A | 8/2000 | Lindeman |
| 6,108,743 A | 8/2000 | Debs et al. |
| 6,111,582 A | 8/2000 | Jenkins |
| 6,111,584 A | 8/2000 | Murphy |
| 6,115,047 A | 9/2000 | Deering |
| 6,115,049 A | 9/2000 | Winner et al. |
| 6,118,462 A | 9/2000 | Margulis |
| 6,128,026 A | 10/2000 | Brothers, III |
| 6,144,365 A | 11/2000 | Young et al. |
| 6,144,387 A | 11/2000 | Liu et al. |
| 6,151,602 A | 11/2000 | Hejlsberg et al. |
| 6,155,926 A | 12/2000 | Miyamoto et al. |
| 6,157,387 A | 12/2000 | Kotani |
| 6,166,748 A | 12/2000 | Van Hook et al. |
| 6,172,678 B1 | 1/2001 | Shiraishi |
| 6,173,367 B1 | 1/2001 | Aleksic et al. |
| 6,177,944 B1 | 1/2001 | Fowler et al. |
| 6,181,352 B1 | 1/2001 | Kirk et al. |
| 6,191,794 B1 | 2/2001 | Priem et al. |
| 6,198,488 B1 | 3/2001 | Lindholm et al. |
| 6,200,253 B1 | 3/2001 | Nishiumi et al. |
| 6,204,851 B1 | 3/2001 | Netschke et al. |
| 6,215,496 B1 | 4/2001 | Szeliski et al. |
| 6,215,497 B1 | 4/2001 | Leung |
| 6,226,012 B1 | 5/2001 | Priem et al. |
| 6,226,713 B1 | 5/2001 | Mehrotra |
| 6,232,981 B1 | 5/2001 | Gossett |
| 6,236,413 B1 | 5/2001 | Gossett et al. |
| 6,239,810 B1 | 5/2001 | Van Hook et al. |
| 6,252,608 B1 | 6/2001 | Snyder et al. |
| 6,252,610 B1 | 6/2001 | Hussain |
| 6,264,558 B1 | 7/2001 | Nishiumi et al. |
| 6,268,861 B1 | 7/2001 | Sanz-Pastor et al. |
| 6,275,235 B1 | 8/2001 | Morgan, III |
| 6,285,779 B1 | 9/2001 | Lapidous et al. |
| 6,292,194 B1 | 9/2001 | Powll, III |
| 6,329,997 B1 | 12/2001 | We et al. |
| 6,331,856 B1 | 12/2001 | Van Hook et al. |
| 6,339,428 B1 | 1/2002 | Fowler et al. |
| 6,342,892 B1 | 1/2002 | Van Hook et al. |
| 6,353,438 B1 | 3/2002 | Van Hook |
| 6,356,497 B1 | 3/2002 | Puar et al. |
| 6,408,362 B1 | 6/2002 | Arimilli et al. |
| 6,417,858 B1 | 7/2002 | Bosch et al. |
| 6,426,747 B1 | 7/2002 | Hoppe et al. |
| 6,437,781 B1 | 8/2002 | Tucker et al. |
| 6,459,429 B1 | 10/2002 | Deering |
| 6,466,223 B1 * | 10/2002 | Dorbie et al. ............... 345/582 |
| 6,469,707 B1 | 10/2002 | Voorhies |
| 6,476,808 B1 | 11/2002 | Kuo et al. |
| 6,476,822 B1 | 11/2002 | Burbank |
| 6,496,187 B1 | 12/2002 | Deering et al. |

FOREIGN PATENT DOCUMENTS

| | | |
|---|---|---|
| EP | 1 075 146 | 2/2001 |
| EP | 1 081 649 | 3/2001 |
| JP | 9-330230 | 12/1997 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |

| | | |
|---|---|---|
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |

OTHER PUBLICATIONS

White paper, Huddy, Richard, "The Efficient Use of Vertex Buffers," (Nov. 01, 2000).

White paper, Spitzer, John, et al., "Using Gl_NV_array_range and GL_NV_Fence on GEForce Products and Beyond" (Aug. 01, 2000).

White paper, Rogers, Douglas H., "Optimizing Direct3D for the GeForce 256" (Jan. 3, 2000).

Hook, Brian, "An Incomplete Guide to Programming DirectDraw and Direct3D Immediate Mode (Release 0.46)," printed from web site: www.wksoftware.com, 42 pages.

Thompson, Tom, "Must–See 3–D Engines," BYTE Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 1997).

"HOWTO: Animate Textures in Direct3D Immediate Mode," printed from web site support.microsoft.com, 3 pages (last reviewed Dec. 15, 2000).

INFO: Rendering a Triangle Using an Execute Buffer, printed from web site support.microsoft.com, 6 pages (last reviewed Oct. 20, 2000).

U.S. application Ser. No. 09/337,293, filed Jun. 21, 1999, Multi–Format Vertex Data Processing Apparatus and Method [issued as U.S. Pat. No. 6,501,479 B1 on Dec. 31, 2002].

Datasheet, SGS–Thomson Microelectronics, nVIDIA™, RIVA 128™ 128–Bit 3D Multimedia Accelerator (Oct. 1997).

Product Presentation, "RIVA128™ Leadership 3D Acceleration," 2 pages.

ZDNet Reviews, from PC Magazine, "Other Enhancements," Jan. 15, 1999, wysiwyg://16/http://www4.zdnet.com . . . ies/reviews/0,4161,2188286,00.html.

ZDNet Reviews, from PC Magazine, "Screen Shot of Alpha–channel Transparency," Jan. 15, 1999, wysiwyg://16/http://www4.zdnet.com . . . . ies/reviews/0,4161,2188286,00.html.

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDT/d . . . penGL/advanced98/notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http:www.sgi.com/software/opengl/advanced98/notes/node148.html.

Winner, Stephanie, et al., "Hardware Accelerated Rendering Of Antialiasing Using a Modified A–buffer Algorithm," Computer Graphics Proceedings, Annual Conference Series, 1997, pp. 307–316.

Debevec, Paul, et al., "Efficient View–Dependent Image–Based Rendering with Projective Texture–Mapping," University of California at Berkeley.

Gibson, Simon, et al., "Interactive Rendering with Real–World Illumination," Rendering Techniques 2000; 11th Eurographics Workshop on Rendering, pp. 365–376 (Jun. 2000).

Segal, Mark, et al., "Fast Shadows and Lighting Effects Using Texture Mapping," Computer Graphics, 26, 2, pp. 249–252 (Jul. 1992).

White paper, Kilgard, Mark J., "Improving Shadows and Reflections via the Stencil Buffer" (Nov. 03, 1999).

"OpenGL Projected Textures," from web site:HTTP:// reality.sgi.com, 5 pages.

"5.13.1 How to Project a Texture," from web site: www.sgi.com, 2 pages.

Arkin, Alan, email, subject: "Texture distortion problem," from web site: HTTP://reality.sgi.com (Jul. 1997).

Moller, Tomas et al., "Real–Time Rendering," pp. 179–183 (AK Peters Ltd., 1999).

Williams, Lance, "Casting Curved Shadows on Curved Surfaces," Computer Graphics (SIGGRAPH '78 Proceedings), vol. 12, No. 3, pp. 270–274 (Aug. 1978).

Woo et al., "A Survey of Shadow Algorithms," IEEE Computer Graphics and Applications, vol. 10, No. 6, pp. 13–32 (Nov. 1990).

Heidrich et al., "Applications of Pixel Textures in Visualization and Realistic Image Synthesis," Proceedings 1999 Symposium On Interactive 3D Gaphics, pp. 127–134 (Apr. 1999).

Hourcade et al, "Algorithms for Antialiased Cast Shadows", Computers and Graphics, vol. 9, No. 3, pp. 260–265 (1985).

Michael McCool, "Shadow Volume Reconstruction from Depth Maps", ACM Transactions on Graphics, vol. 19, No. 1, Jan. 2000, pp. 1–26.

RenderMan Artist Tools, PhotoRealistic RenderMan 3.8 User's Manual, Pixar (Aug. 1998).

RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," pp. 289–291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics 1999, Atlanta, 7 pages (Apr. 26–29, 1999).

Schlechtweg, Stefan et al., Rendering Line–Drawings with Limited Resources, Proceedings of GRAPHICON '96, 6th International Conference and Exhibition on Computer Graphics and Visualization in Russia, (St. Petersburg, Jul. 1–5, 1996) vol. 2, pp. 131–137.

Haeberli, Paul et al., "Texture Mapping as a Fundamental Drawing Primitive," Proceedings of the Fourth Eurographics Workshop on Rendering, 11pages, Paris, France (Jun. 1993).

Schlechtweg, Stefan et al., "Emphasising in Line–drawings," Norsk samarbeid innen grafisk databehandling: NORSIGD Info, medlemsblad for NORSIGD, Nr 1/95, pp. 9–10.

Markosian, Lee et al., "Real–Time Nonphotorealistic Rendering," Brown University site of the NSF Science and Technology Center for Computer Graphics and Scientific Visualization, Providence, RI, 5 pages (undated).

Feth, Bill, "Non–Photorealistic Rendering," wif3 @ cornell.edu, CS490—Bruce Land, 5 pages (Spring 1998).
Elber, Gershon, "Line Art Illustrations of Parametric and Implicit Forms," IEEE Transactions on Visualization and Computer Graphics, vol. 4, No. 1, Jan.–Mar. 1998.
Zeleznik, Robert et al."SKETCH: An Interface for Sketching 3D Scenes," Computer Graphics Proceedings, Annual Conference Series 1996, pp. 163–170.
Computer Graphics World, Dec. 1997.
Reynolds, Craig, "Stylized Depiction in Computer Graphics, Non–Photorealistic, Painterly and 'Toon Rendering," an annotated survey online resources, 13 pages, last update May 30, 2000, http://www.red.com/cwr/painterly.html.
Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.
Decaudin, Philippe, "Cartoon–Looking Rendering of 3D Scenes," Syntim Project Inria, 6 pages, http:// www–syntim.inria.fr/syntim/recherche/decaudin/cartoon–eng. html.
Hachigian, Jennifer, "Super Cel Shader 1.00 Tips and Tricks," 2 pages, wysiwyg://thePage.13/http://members.xoom.com/_XMCM.jarvia/3D/celshade.html.
Digimation Inc., "The Incredible Comicshop," info sheet, 2 pages, http://www.digimation.com/asp/product/asp?product_id=33.
Softimage/3D Full Support, "Toon Assistant," 1998 Avid Technology, Inc., 1 page, http://www.softimage.com/3dsupport/techn . . . uments/3.8/features3.8/rel_notes.56.html.
Cambridge Animo—Scene III, info sheet, Cambridge Animation Systems, 2 pages, http://www.cam–ani.co.uk/casweb/products/software/SceneIII.htm.
Mulligan, Vikram, "Toon," info sheet, 2 pages, http://digitalcarversguild.com/products/toon/toon.thml.
Toony Shaders, "Dang I'm tired of photorealism," 4 pages, http://www.visi.com/~mcdonald/toony.html.
"Cartoon Shading, Using Shading Mapping," 1 page, http://www.goat.com/alias/shaders.html#toonshad.
web site information, CartoonReyes, http://www.zentertainment.com/zentropy/review/cartoonreyes.html.
VIDI Presenter 3D Repository, "Shaders." 2 pages, http://www.webnation.com/vidirep/panels/renderman/shaders/toon.phtml.
The RenderMan Interface Version 3.1, (Sep. 1989).
"Renderman Artist Tools, PhotoRealistic RenderMan Tutorial," Pixar (Jan. 1996).
Web site materials, "Renderman Artist Tools, PhotoRealistic RenderMan 3.8 User's Manual," Pixar.
NVIDIA.com, technical presentation, "AGDC Per–Pixel Shading" (Nov. 15, 2000).
NVIDIA.com, technical presentation, Introduction to DX8 Pixel Shaders (Nov. 10, 2000).
NVIDIA.com, technical presentation, "Advanced Pixel Shader Details" (Nov. 10, 2000).
"Developer's Lair, Multitexturing with the ATI Rage Pro," (7 pages) from ati.com web site (2000).
Slide Presentation, Sébastien Dominé, "nVIDIA Mesh Skinning, OpenGI".
Singh, Karan et al., "Skinning Characters using Surface–Oriented Free–Form Deformations," Toronto Canada.
"Hardware Technology," from ATI.com web site, 8 pages (2000).
"Skeletal Animation and Skinning," from ATI.com web site, 2 pages (Summer 2000).
"Developer Relations, ATI Summer 2000 Developer Newsletter," from ATI.com web site, 5 pages (Summer 2000).
Press Releases, "ATI's RADEON family of products delivers the most comprehensive support for the advance graphics features of DirectX 8.0," Canada, from ATI.com web site, 2 pages (Nov. 9, 2000).
"ATI RADEON Skinning and Tweening," from ATI.com web site, 1 page (2000).
Hart, Evan et al., "Vertex Shading with Direct3D and OpenGL," Game Developers Conference 2001, from ATI.com web site (2001).
Search Results for: skinning, from ATI.com web site, 5 pages (May 24, 2001).
Hart, Evan et al., "Graphics by rage," Game Developers Conference 2000, from ATI.com web site (2000).
Efficient Command/Data Interface Protocol For Graphics, IBM TDB, vol. 36, issue 9A, Sep. 1, 1993, pp. 307–312.
Shade, Jonathan et al., "Layered Depth Images," Computer Graphics Proceedigs, Annnual Conference Series, pp. 231–242 (1998).
Videum Conference Pro (PCI) Specification, product of Winnov (Winnov), published Jul. 21, 1999.
Hoppe, Hugues, "Optimization of Mesh Locality for Transparent Vertex Caching," Proceedings Of Siggraph, pp. 269–276 (Aug. 8–13, 1999).
Whitepaper: Implementing Fog in Direct3D, Jan. 3, 2000, www.nvidia.com.
Akeley, Kurt, "Reality Engine Graphics", 1993, Silicon Graphics Computer Systems, pp. 109–116.
Photograph of Sony PlayStation II System.
Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W–Buffering", Doug Rogers, Jan. 31, 2000, www.nvidia.com.
Whitepaper: Using GL_NV_vertex_fence, posted Aug. 1, 200, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.

Mitchell et al, "Multitexturing in DirectX6", Game Developer, Sep. 1998, www.gdmag.com.

VisionTek, "GeForce2 GS Graphics Processing Unit", ©2000 www.visiontek.com.

Jim Bushnell et al. "Advanced Multitexture Effects With Direct3D and OpenGL", Pyramid Peak Design & ATI Research, Inc., GameDevelopers Conference, ©1999.

Sony PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Onling Highlights, Oct. 20, 1999.

Joel Easley, "PlayStation II Revealed", Game Week, Sep. 29, 1999.

Inside Sony's Next Generation Playstation, ©1999.

Press Releases, Mar. 18, 1999.

Chris Johnston, "PlayStation Part Deux", Press Start, ©1999.

Nikkei Shimbun, "Sony Making SME, Chemical and SPT into Wholly–Owned Subsidiaries", Mar. 9, 1999.

AM News: Japanese Developers Not All Sold on PS2, Next Generation, Mar. 16, 1999.

Sony To Turn PlayStation Maker Into Wholly Owned Unit–Nikkei, Dow Jones News Service, Mar. 8, 1999.

Yumiko Ono, Sony Antes Up Its Chips In Bet On New Game System, Down Jones News Service, Mar. 4, 1999.

MacWeek.Com Gets Inside Story on Conectix VGS for Windows; Controversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating–Point MAC's, 4 Floating–Point Dividers, and an MPEG2 Decoder, 1999 IEEE International Solid–State Conference, Feb. 16, 1999.

Dreamcast Instruction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStation II", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug. 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ. N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov., 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.

James F. Blinn, "Simulationof Wrinkled Surfaces," Caltech/JPL, pp. 286–292, SIGGRAPH 78 (1978).

Tomas Möller and Eric Haines "Real–Time Rendering", AK Peters, Ltd., ©1999, pp. 127–142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 07, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000 www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presentation: D3D 7 Vertex Lighting, Mar. 15, 2000, www.nvidia.com.

Technical Presentation: Per–Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999 www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999 www.nvidia.com.

Technical Presenttion: Guard Band Clipping, Nov. 3, 1999, www.nvidia.com.

The RenderMan Interface, Stephan R. Keith, Version 3.1, Pixar Animation Studies, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, 2/99, www.game-revolution.com.

Marlin Rowley, "GeForce 1 & 2 GPU Speed Tests", May, 11, 2000, www.g256.com.

"Dreamcast: The Full Story", Next Generation, Sep. 1998.

DirectX 7.0 Programmer's Reference, Microsoft Corporation,1995–1999 (as part of the DirectX 7.0 SDK on the Companion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addision–Wesley Publishing Co., 1993.

"Procedural Elements for Computer Graphics," Second Edition, David F. Rogers, McGraw Hill, 1998.

"Real–Time Rendering," Tomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

* cited by examiner

Fig. 5  EXAMPLE GRAPHICS PROCESSOR FLOW

Logical Block Diagram of Indirect Texture Processing

REGULAR TEXTURE LOOKUP

INDIRECT TEXTURE LOOKUP

Physical Block Diagram of Direct and Indirect Texture Processing

REGULAR (NON-INDIRECT) TEXTURE PROCESSING

REGULAR AND INDIRECT TEXTURE PROCESSING

EXAMPLE BUMP/TEXTURE COORDINATE PROCESSING UNIT

*EXAMPLE INDIRECT-TEXTURE LOOKUP DATA PROCESSING LOGIC*

Matrix A

$$\begin{pmatrix} s/256 & t/256 \\ 0 & 0 \\ 0 & 0 \end{pmatrix}$$

$$\begin{pmatrix} s' \\ t' \end{pmatrix} = \overbrace{\begin{pmatrix} ma & mb \\ mc & md \\ me & mf \end{pmatrix}}^{M} \cdot \overbrace{\begin{pmatrix} s \\ t \\ u \end{pmatrix}}^{V}$$

Fig. 16A
*EXAMPLE TEXTURE OFFSET MATRICES*

Matrix B

$$\begin{pmatrix} 0 & 0 \\ s/256 & t/256 \\ 0 & 0 \end{pmatrix}$$

Fig. 16B
*EXAMPLE TEXTURE OFFSET MATRICES*

| | | | |
|---|---|---|---|
| MTXA$_j$ | s$_j$ (1:0) | mb$_j$ (10:0) | ma$_j$ (10:0) |
| MTXB$_j$ | s$_j$ (3:2) | md$_j$ (10:0) | mc$_j$ (10:0) |
| MTXC$_j$ | s$_j$ (5:4) | mf$_j$ (10:0) | me$_j$ (10:0) |
| CMDi | ▨ fb$_j$ ▨ tw$_j$ sw$_j$ m$_j$ ▨ bias$_j$ fmt$_j$ bt$_j$ | | |
| | ⋮ | | |
| | | | imask (7:0) |
| GEN MODE | ▨ nbmp | ntev | ntex |

Fig. 17
*EXAMPLE CONTROL LOGIC REGISTERS*

*(INDIRECT TILING METHOD)*

*(PSEUDO 3-D TILE TEXTURES)*

(TILING METHOD 1)

(TILING METHOD 1)

(2ND EXAMPLE OF TILING METHOD 1)

(3d Example of Tiling method 1)

*(TILING METHOD 1)*

(TILING METHOD 2)

(TILING METHOD 2)
(PSEUDO - 3D TEXTURES)

(TILING METHOD 2)
(PSEUDO - 3D TEXTURES)

METHOD AND APPARATUS FOR TEXTURE TILING IN A GRAPHICS SYSTEM

SPECIFICATION

This application is filed in accordance with 35 U.S.C. §119(e)(1) and claims the benefit of the provisional application Ser. No. 60/227,033 filed on Aug. 23, 2000, entitled "Method And Apparatus For Texture Tiling In A Graphics System."

CROSS-REFERENCE TO RELATED APPLICATIONS

This application is related to the following co-pending applications identified below (by title and attorney docket number), which focus on various aspects of the graphics system described herein. Each of the following applications are hereby incorporated herein by reference.

provisional Application No. 60/161,915, filed Oct. 28, 1999 and its corresponding utility application Ser. No. 09/465,754, filed Dec. 17, 1999, both entitled "Vertex Cache For 3D Computer Graphics", provisional Application No. 60/226,912, filed Aug. 23, 2000 and its corresponding utility application Ser. No. 09/726,215, filed Nov. 28, 2000, both entitled "Method and Apparatus for Buffering Graphics Data in a Graphics System", provisional Application No. 60/226,889, filed Aug. 23, 2000 and its corresponding utility application Ser. No. 09/722,419, filed Nov. 28, 2000, both entitled "Graphics Pipeline Token Synchronization", provisional Application No. 60/226,891, filed Aug. 23, 2000 and its corresponding utility application Ser. No. 09/722,382, filed Nov. 28, 2000, both entitled "Method And Apparatus For Direct and Indirect Texture Processing In A Graphics System", provisional Application No. 60/226,888, filed Aug. 23, 2000 and its corresponding utility application Ser. No. 09/722,367, filed Nov. 28, 2000, both entitled "Recirculating Shade Tree Blender For A Graphics System", provisional Application No. 60/226,892, filed Aug. 23, 2000 and its corresponding utility application Ser. No. 09/726,218, filed Nov. 28, 2000, both entitled "Method And Apparatus For Efficient Generation Of Texture Coordinate Displacements For Implementing Emboss-Style Bump Mapping In A Graphics Rendering System", provisional Application No. 60/226,893, filed Aug. 23, 2000 and its corresponding utility application Ser. No. 09/722,381 filed Nov. 28, 2000., both entitled "Method And Apparatus For Environment-Mapped Bump-Mapping In A Graphics System", provisional Application No. 60/227,007, filed Aug. 23, 2000 and its corresponding utility application Ser. No. 09/726,216, filed Nov. 28, 2000, both entitled "Achromatic Lighting in a Graphics System and Method", provisional Application No. 60/226,900, filed Aug. 23, 2000 and its corresponding utility application Ser. No. 09/726,226, filed Nov. 28, 2000, both entitled "Method And Apparatus For Anti-Aliasing In A Graphics System", provisional Application No. 60/226,910, filed Aug. 23, 2000 and its corresponding utility application Ser. No. 09/722,380, filed Nov. 28, 2000, both entitled "Graphics System With Embedded Frame Buffer Having Reconfigurable Pixel Formats", utility Application Ser. No. 09/585,329, filed Jun. 2, 2000, entitled "Variable Bit Field Color Encoding", provisional Application No. 60/226,890, filed Aug. 23, 2000 and its corresponding utility application Ser. No. 09/726,227, filed Nov. 28, 2000, both entitled "Method And Apparatus For Dynamically Reconfiguring The Order Of Hidden Surface Processing Based On Rendering Mode", provisional Application No. 60/226,915, filed Aug. 23, 2000 and its corresponding utility application Ser. No. 09/726,212 filed Nov. 28, 2000, both entitled "Method And Apparatus For Providing Non-Photorealistic Cartoon Outlining Within A Graphics System", provisional Application No. 60/227,032, filed Aug. 23, 2000 and its corresponding utility application Ser. No. 09/726,225, filed Nov. 28, 2000, both entitled "Method And Apparatus For Providing Improved Fog Effects In A Graphics System", provisional Application No. 60/226,885, filed Aug. 23, 2000 and its corresponding utility application Ser. No. 09/722,664, filed Nov. 28, 2000, both entitled "Controller Interface For A Graphics System", provisional Application No. 60/226,899, filed Aug. 23, 2000 and its corresponding utility application Ser. No. 09/722,667, filed Nov. 28, 2000, both entitled "Method And Apparatus For Pre-Caching Data In Audio Memory", provisional Application No. 60/226,913, filed Aug. 23, 2000 and its corresponding utility application Ser. No. 09/722,378, filed Nov. 28, 2000, both entitled "Z-Texturing", provisional Application No. 60/227,031, filed Aug. 23, 2000 entitled "Application Program Interface for a Graphics System", provisional Application No. 60/227,030, filed Aug. 23, 2000 and its corresponding utility application Ser. No. 09/722,663, filed Nov. 28, 2000, both entitled "Graphics System With Copy Out Conversions Between Embedded Frame Buffer And Main Memory", provisional Application No. 60/226,886, filed Aug. 23, 2000 and its corresponding utility application Ser. No. 09/722,665, filed Nov. 28, 2000, both entitled "Method and Apparatus for Accessing Shared Resources", provisional Application No. 60/226,894, filed Aug. 23, 2000 and its corresponding utility application Ser. No. 09/726,220, filed Nov. 28, 2000, both entitled "Graphics Processing System With Enhanced Memory Controller", provisional Application No. 60/226,914, filed Aug. 23, 2000 and its corresponding utility application Ser. No. 09/722,390, filed Nov. 28, 2000, both entitled "Low Cost Graphics System With Stitching Hardware Support For Skeletal Animation", and provisional Application No. 60/227,006, filed Aug. 23, 2000 and its corresponding utility application Ser. No. 09/722,421, filed Nov. 28, 2000, both entitled "Shadow Mapping In A Low Cost Graphics System".

FIELD OF THE INVENTION

The present invention relates to computer graphics, and more particularly to interactive graphics systems such as home video game platforms. Still more particularly this invention relates to an improved texture tiling method and apparatus which uses indirect texture index maps to reference texture tiles in a tile definition map and map the texture tiles onto a rendered primitive. The invention further enables synthesized (blended) texture tiles to be created from a tile definitions map and mapped onto a primitive in a manner which prevents the appearance of repeating texture patterns.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was how to create realistic looking surface detail on a rendered object without resorting to explicit modeling of the desired details with polygons or other geometric primitives. Although surface details can be simulated, for example, using myriad small triangles with interpolated shading between vertices, as the desired detail becomes finer and more intricate, explicit modeling with triangles or other primitives places high demands on the graphics system and becomes less practical. An alternative technique pioneered by E. Catmull and refined by J. F. Blinn and M. E. Newell is to "map" an image, either digitized or synthesized, onto a surface. (See "A Subdivision Algorithm for Computer Display of Curved Surfaces" by E. Catmull, Ph.D. Thesis, Report UTEC-CSc-74-133, Computer Science Department, University of Utah, Salt Lake City, Utah., December 1994 and "Texture and Reflection in Computer Generated Images" by J. F. Blinn and M. E. Newell, CACM, 19(10), October 1976, 452–457). This approach is known as texture mapping (or pattern mapping) and the image is called a texture map (or simply referred to as a texture). Alternatively, the texture map may be defined by a procedure rather than an image.

Typically, the texture map is defined within a 2D rectangular coordinate space and parameterized using a pair of orthogonal texture coordinates such, as for example, (u, v) or (s, t). Individual elements within the texture map are often called texels. At each rendered pixel, selected texels are used either to substitute for or to scale one or more material properties of the rendered object surface. This process is often referred to as texture mapping or "texturing."

Most 3-D graphics rendering systems now include a texturing subsystem for retrieving textures from memory and mapping the textures onto a rendered object surface. A problem confronting graphics system designers is how to provide more sophisticated texture related effects such as "texture tiling" in an efficient and advantageous manner. Texture tiling generally involves mapping textures in the form of texture tiles on a tile-by-tile basis onto a rendered object surface, such as a 2-D surface. A texture tile can be defined by a tile shaped portion of a texture stored in texture memory. An array or matrix of different tiles can be defined in texture memory. The size and shape of the tile can be selected to facilitate mapping of the tile onto a particular rendered surface. The tile size can vary and can be defined such that numerous tiles are required to cover a rendered surface. Once defined, texture tiles can be placed in specific locations over the rendered surface to create a textured surface.

This tiling effect has been achieved in the past by, for example, drawing a polygon for each desired tile. However, this technique can be expensive in terms of processing overhead and memory usage. In addition, a problem resulting from prior art tiling techniques is that the tiled surface can have a repeating pattern that can be visually perceived by the viewer. Repeating patterns result from the fact that there is generally a limited number of different texture tiles available to the programmer when tiling a surface. Thus, large surfaces, such as walls, floors, ground cover or the like, will use the same texture tiles numerous times in order to completely cover the surface. Such repeated use of the same tiles can detract from the realism of a rendered scene, due to the fact that, in many instances, the human eye can pick up on and see the repeating texture pattern resulting from the tiling process. A further problem confronting graphics systems designers is how to take advantage of indirect texturing processing to perform texture tiling operations. Thus, while significant work has been done in the past in connection with texture tiling, further improvements are possible and desirable.

The present invention solves this problem by providing techniques and arrangements that can be used to efficiently implement texture tiling in a graphics system. The present invention further enables more realistic texture tiled surfaces to be created that reduce or even eliminate the ability of a viewer of the displayed textured surface to notice any repeating patterns in the texture. The invention also enables pseudo-3D textures to be created by blending between textures tiles. The invention further enables indirect texture processing hardware to be used in an efficient and effective manner to achieve texture tiling.

In accordance with one aspect provided by the invention, the texture tiling method includes:
  generating texture coordinates;
  modifying the texture coordinates using an indirect tile index map;
  using the modified texture coordinate to select a texture tile from a tile definitions map; and
  displaying the selected texture tile.

In accordance with another aspect of the invention, the pseudo-3D tiling method includes:
  defining a set of direct texture coordinates;
  defining a set of indirect texture coordinates;
  using the indirect texture coordinates to obtain an offset value;
  combining the offset value with at least one of the direct texture coordinates to produce a first set of modified texture coordinates;

using the first set of modified texture coordinates to obtain a first texture tile from a tile definitions map biasing the offset value;

modifying the direct texture coordinates using the biased offset value;

combining the modified offset value with at least one of the direct texture coordinates to produce a second set of modified texture coordinates;

using the second set of modified texture coordinates to obtain a second texture tile from the tile definitions map; and blending the first texture tile and the second texture tile to produce a synthesized texture tile.

BRIEF DESCRIPTION OF THE DRAWINGS

These and other features and advantages provided by the invention will be better and more completely understood by referring to the following detailed description of presently preferred embodiments in conjunction with the drawings, of which:

FIGS. 16A and 16B show example texture offset matrices used by processing logic circuit (proc) of FIG. 15;

FIG. 17 is a block diagram illustrating example data field formats of control logic registers for controlling the operations within the processing circuitry of FIG. 15;

FIG. 19 is a more detailed functional block diagram of the first tiling method of FIG. 18a;

DETAILED DESCRIPTION OF EXAMPLE EMBODIMENTS OF THE INVENTION

Figure 1:
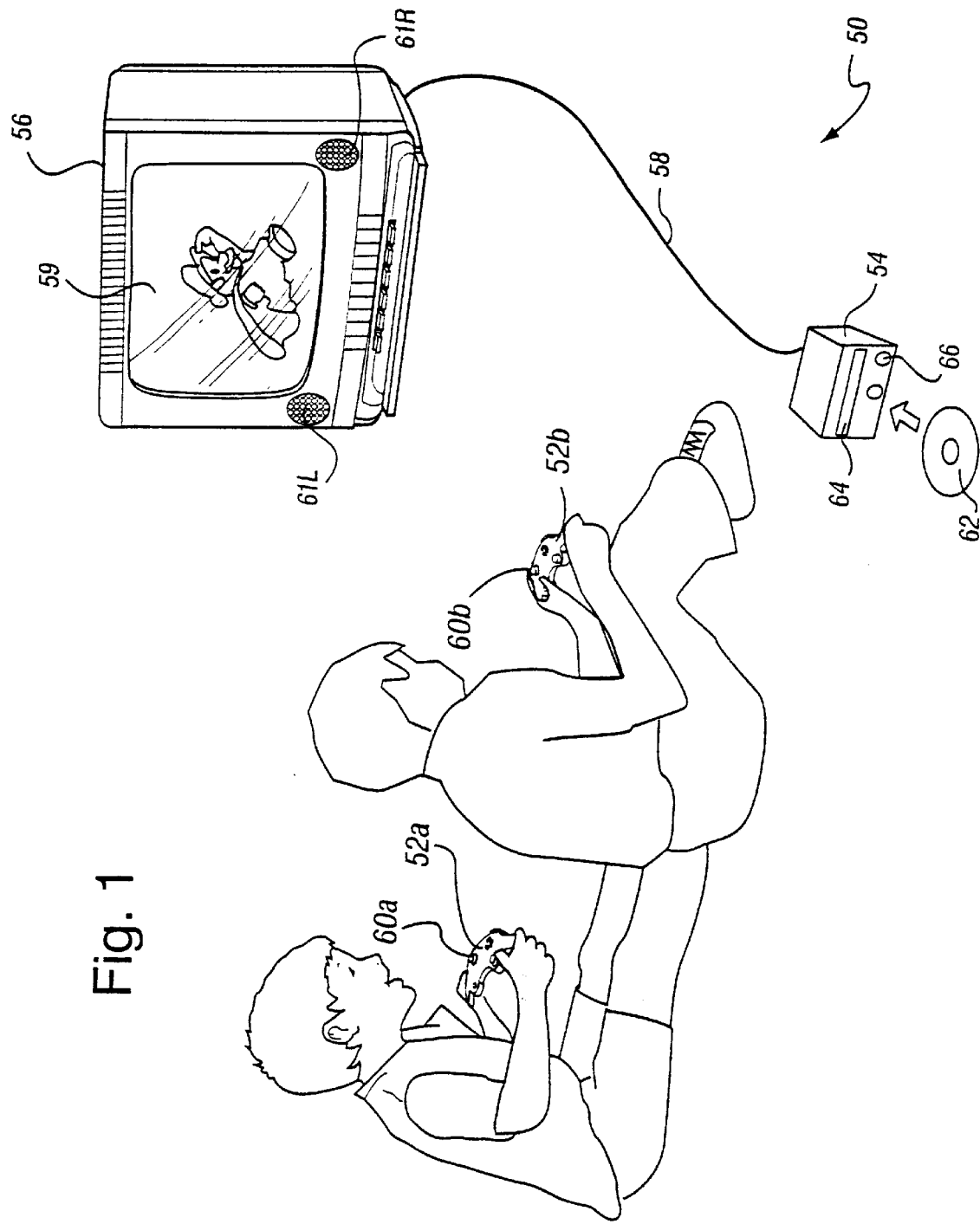
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
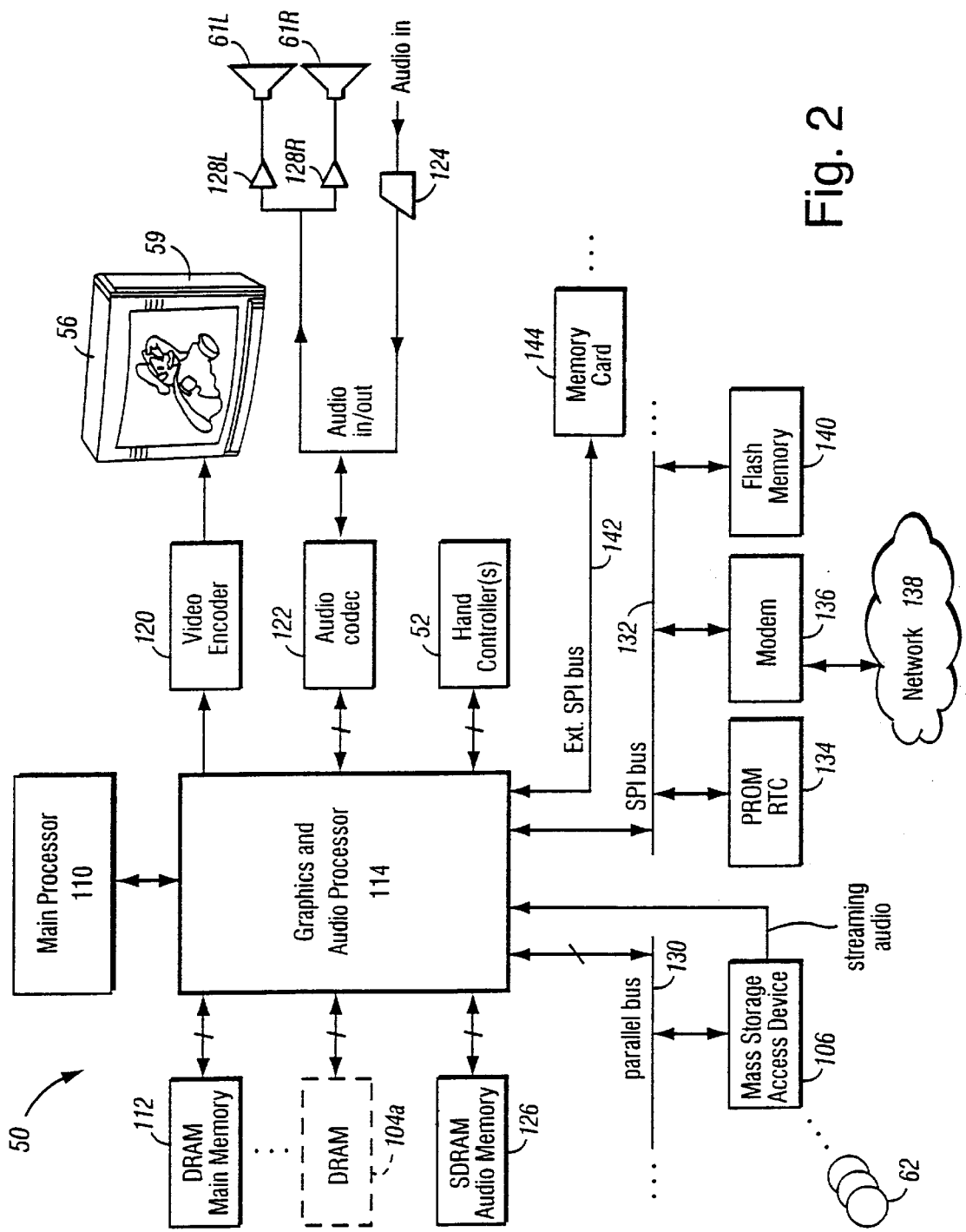
FIG. 2 is a block diagram of the FIG. 1 example computer graphics system.

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

a programmable read-only memory and/or real time clock 134, a modem 136 or other networking interface (which may in turn connect system 50 to a telecommunications network 138 such as the Internet or other digital network from/to which program instructions and/or data can be downloaded or uploaded), and flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
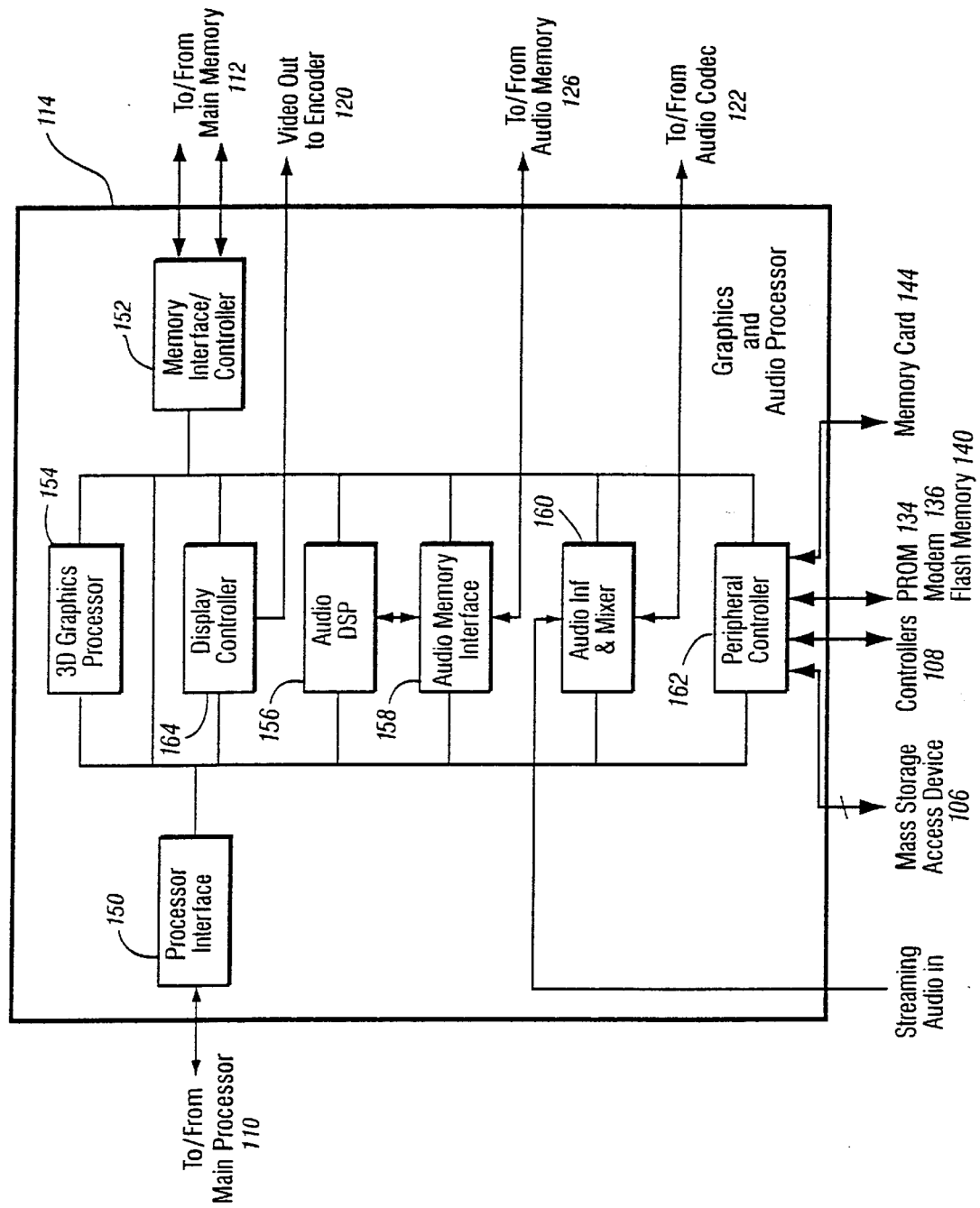
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

a processor interface 150, a memory interface/controller 152, a 3D graphics processor 154, an audio digital signal processor (DSP) 156, an audio memory interface 158, an audio interface and mixer 160, a peripheral controller 162, and a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
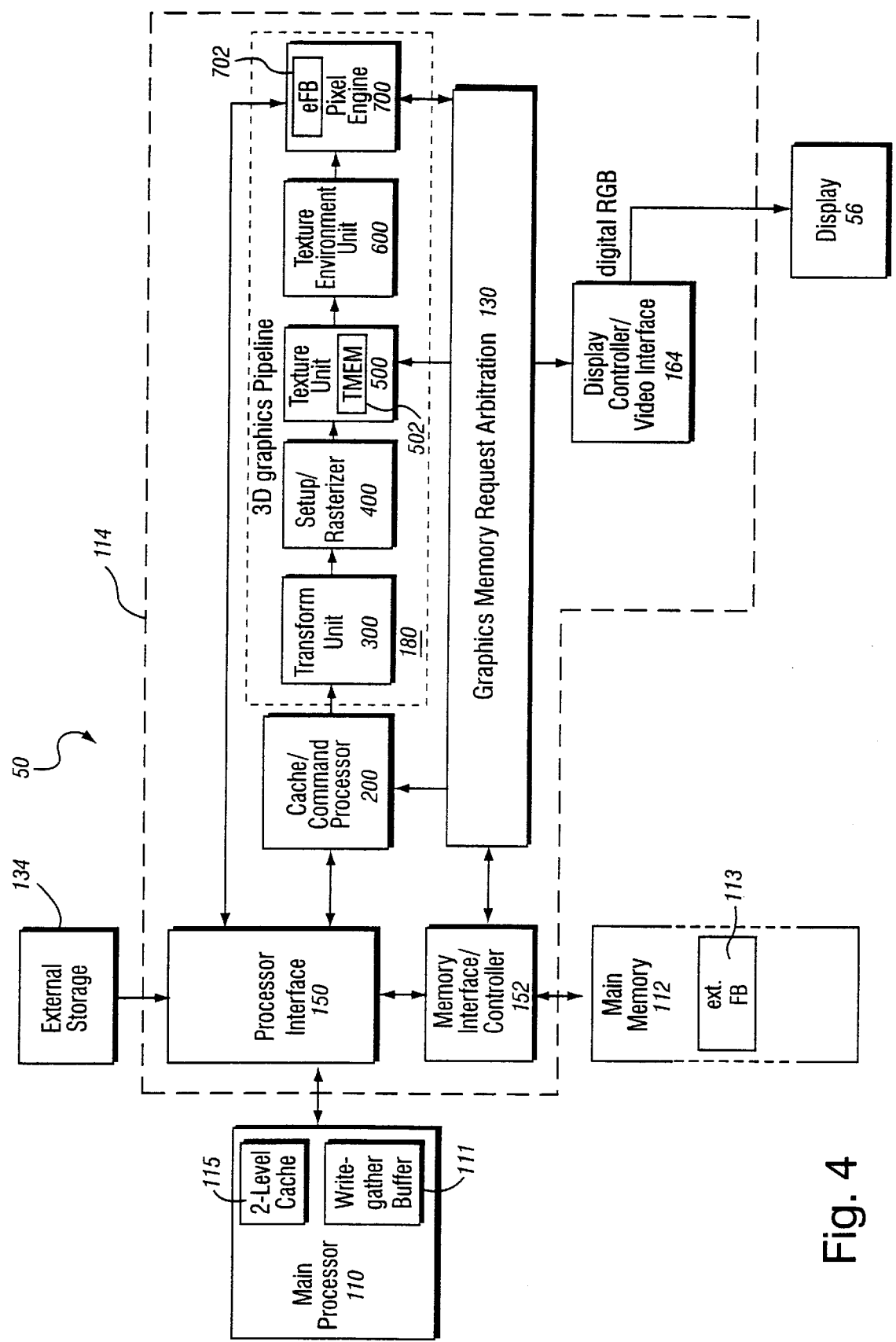
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 11 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164— which displays the frame buffer output of pipeline 180 on display 56.

Figure 5:
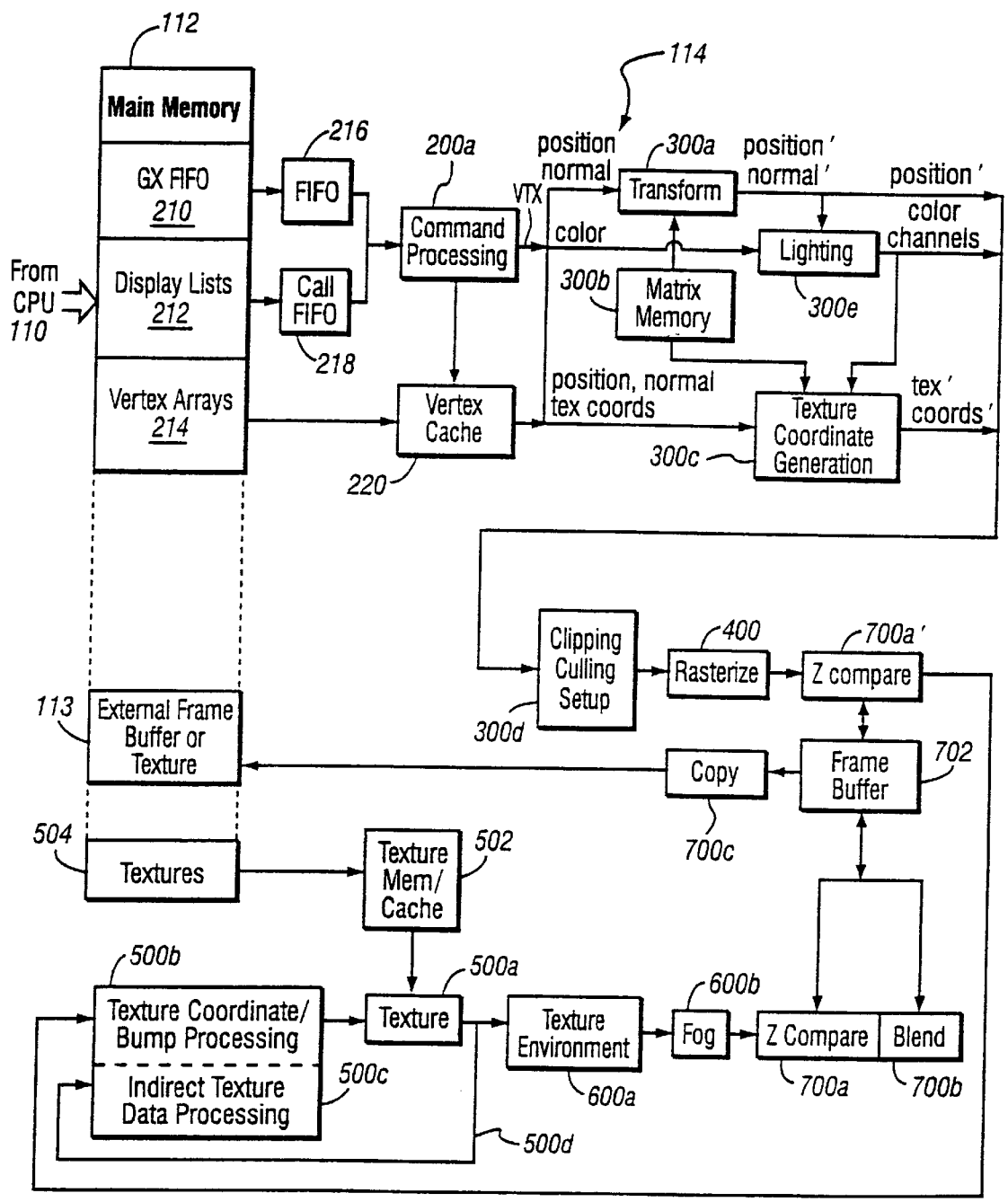
FIG. 5 is an example logical flow diagram of the FIG. 4 graphics and audio processor.
Figure 6:
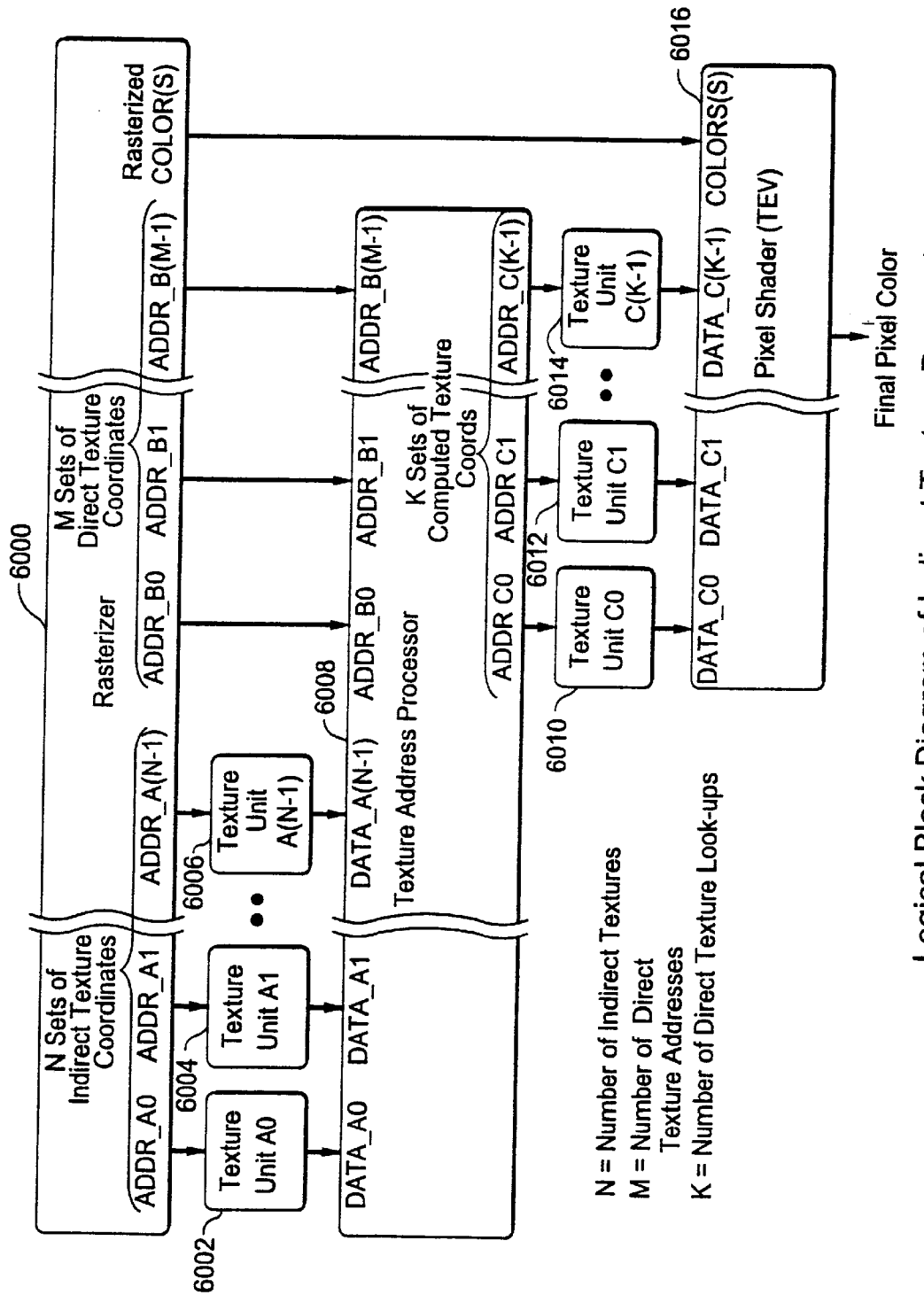
FIG. 6 is block diagram illustrating a logical overview of indirect texture processing in accordance with the present invention.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

command streams from main memory 112 via an on-chip FIFO memory buffer 216 that receives and buffers the graphics commands for synchronization/flow control and load balancing, display lists 212 from main memory 112 via an on-chip call FIFO memory buffer 218, and vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

a transform unit 300, a setup/rasterizer 400, a texture unit 500, a texture environment unit 600, and a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c)

FIGS. 6 through 17 illustrate example texture processing for performing regular (non-indirect) and indirect texture lookup operations. A more detailed description of the example graphics pipeline circuitry and procedures for performing regular and indirect texture look-up operations is disclosed in commonly assigned co-pending patent application, Ser. No. 60/226,891, entitled "Method And Apparatus For Direct And Indirect Texture Processing In A Graphics System", the entire contents of which are incorporated herein by reference.

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending. For more details concerning the texture environment unit 600, see concurrently filed commonly assigned application Ser. No. 60/226, 888 entitled "Recirculating Shade Tree Blender for a Graphics System", incorporated by reference herein.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Overview of Example Texture Tiling Procedures

The instant invention provides two different tiling methods, both of which preferably use indirect texture tile maps. The first method provides an indirect texture tiling method, and the second method enables unique texture tiles to be created by blending between multiple tiles to achieve, for example, a pseudo-3D texture effect.

Figure 18A:
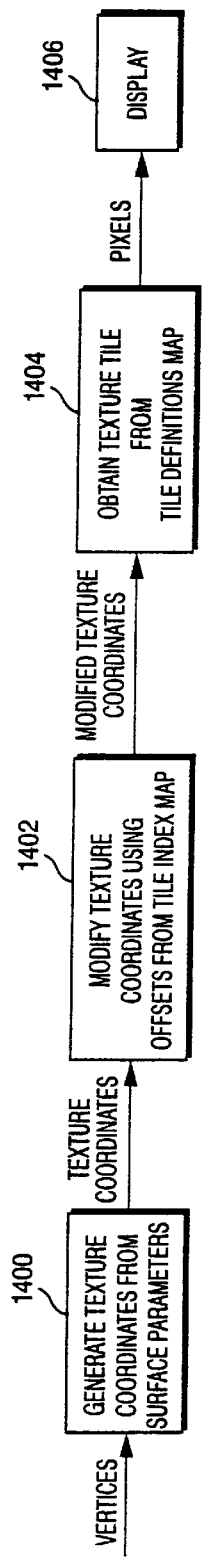
FIG. 18a is a general functional block diagram of a first tiling method in accordance with a preferred embodiment of the instant invention.

FIG. 18a shows an example procedure for the indirect texture tiling method of the instant invention. In accordance with this exemplary first procedure, texture coordinates are generated from surface parameters of a rendered object (block 1400). An tile index map is used to obtain tile select offsets which are used to modify the texture coordinates (block 1402). The modified texture coordinates are then used to select a texture tile from a tile definitions map (block 1404). The texture tile may contain any type of texture that is desired for use in a tiling operation, such as bricks, grass, or any other suitable pattern or portion of a larger pattern. The resulting tile textured image is then displayed (block 1406).

Figure 18B:
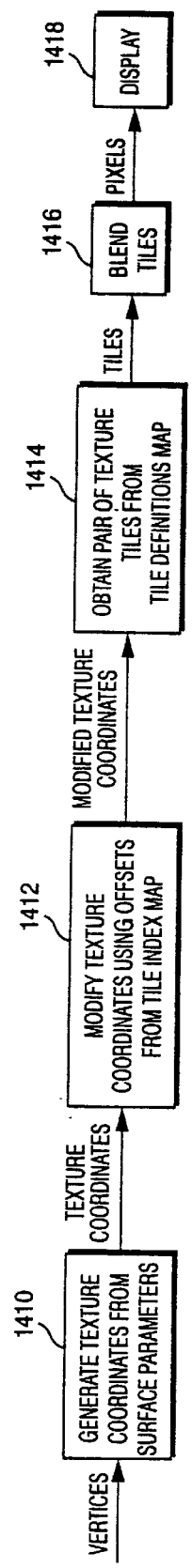
FIG. 18b is a general functional block diagram of a second tiling method in accordance with a preferred embodiment of the instant invention.

FIG. 18b shows an example procedure for the texture blending or pseudo 3-D texture method of the instant invention. In accordance with this exemplary second procedure, texture coordinates are also generated from surface parameters (block 1410). The texture coordinates are then used to obtain at least one texture select offset which is used to modify the texture coordinates (block 1412). The modified texture coordinates are then used to select multiple texture tiles from a tile definitions map (block 1414). The tiles are then blended together to form a synthesized tile texture (block 1416). The resulting synthesized tile textured image is then displayed (Block 1418).

Both of the above described tiling methods of the present invention will be described separately in greater detail below. Both of the tiling methods described herein are preferably implemented through the use of the indirect texture processing system as described in the above-referenced co-pending patent application. However, any suitable processing system incorporating, for example, recirculating, multiple parallel channel or other processing circuitry can be used in accordance with the instant invention.

Example Indirect Texture Tiling (First Tiling Method)

Figure 19:
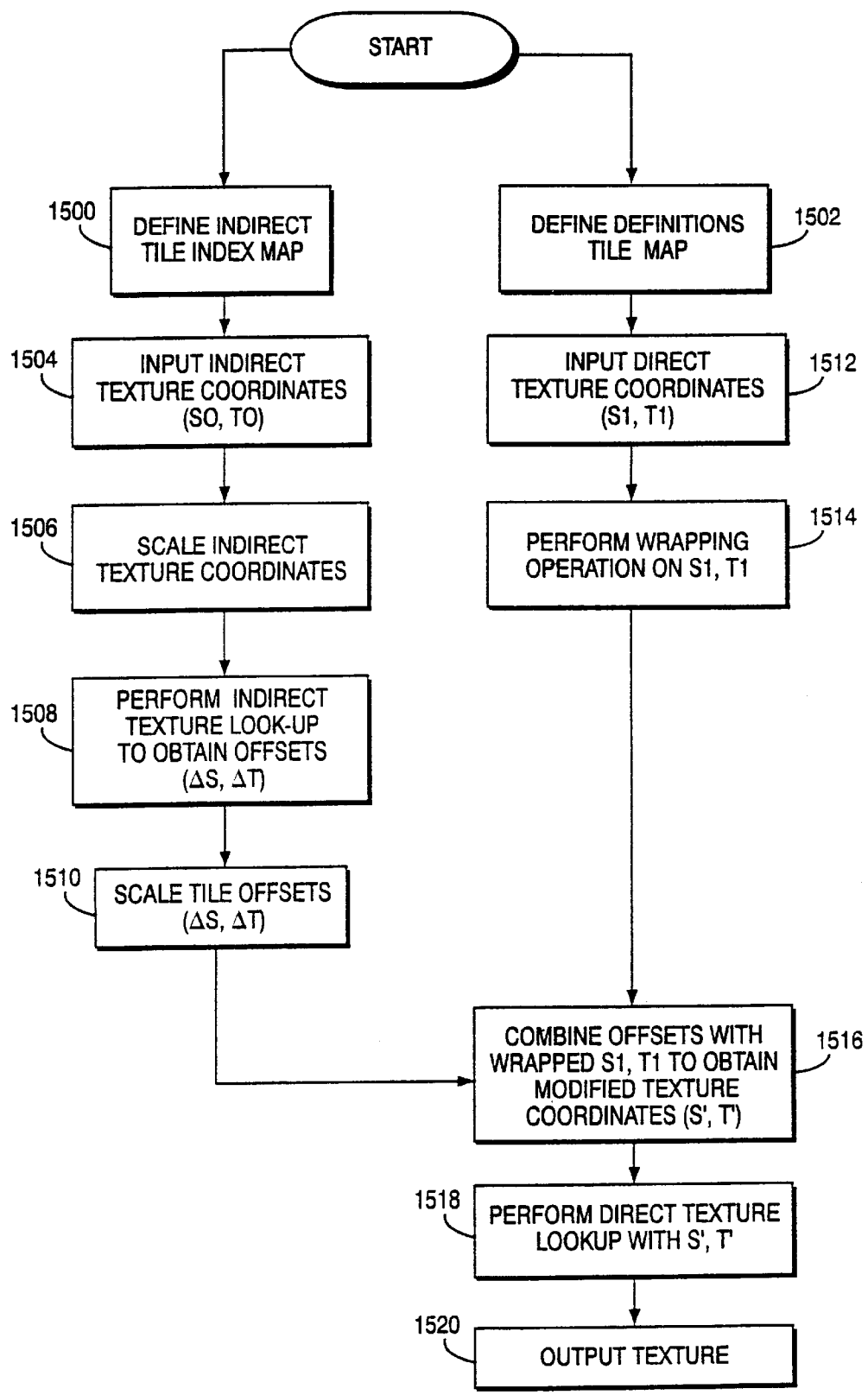

FIG. 19 shows a more detailed exemplary block diagram of the instant indirect texture tiling method as shown in FIG. 18a. In accordance with this method, an indirect tile index map and a tile definitions map are defined (blocks 1500, 1501). The tile definitions map holds the base definitions for a variety of tiles. The indirect tile index map identifies specific locations for specific tiles on the surface of the object being textured. In order to map the tiles on the object in this manner, a pair of indirect texture coordinates (S0,T0) are generated (block 1504). In this example, the indirect texture coordinates are based on a scale for the textured surface not the index map. This advantageously enables the same texture coordinates to be used for the direct texture coordinates and the indirect texture coordinates. Thus, the indirect texture coordinates are appropriately scaled to the index map by, for example, dividing the coordinates by the respective dimensions of the tiles being used (block 1506). The scaled texture coordinates are then used to perform a look-up operation in the texture index map to obtain appropriate tile select offsets (ΔS, ΔT) for the current texture coordinates (block 1508). The tile select offsets are then rescaled to the subject texture scale by, for example, multiplying the offsets by the respective dimensions of the tiles being used (block 1510).

A set of direct texture coordinates (S1,T1) are also defined (block 1512). As explained above, the indirect and direct texture coordinates are actually the same in this example embodiment. A wrapping operation is performed on the direct texture coordinates (block 1514). In this example, the wrapping operation is modulo n wrap, where n is the dimension of the tile being used.

Once the appropriately scaled tile offsets (ΔS, ΔT) and wrapped texture coordinates (S1, T1) are obtained, they are combined (block 1516) to produce a set of modified texture coordinates (S',T'). The modified texture coordinates (S',T') are then used to perform a look-up operation in the tile definitions map (block 1518), in order to obtain the desired texture tile for the current texture coordinates. The selected texture tile is then output for display (block 1520) (or possibly for use in further texture processing operations).

Figure 20A:
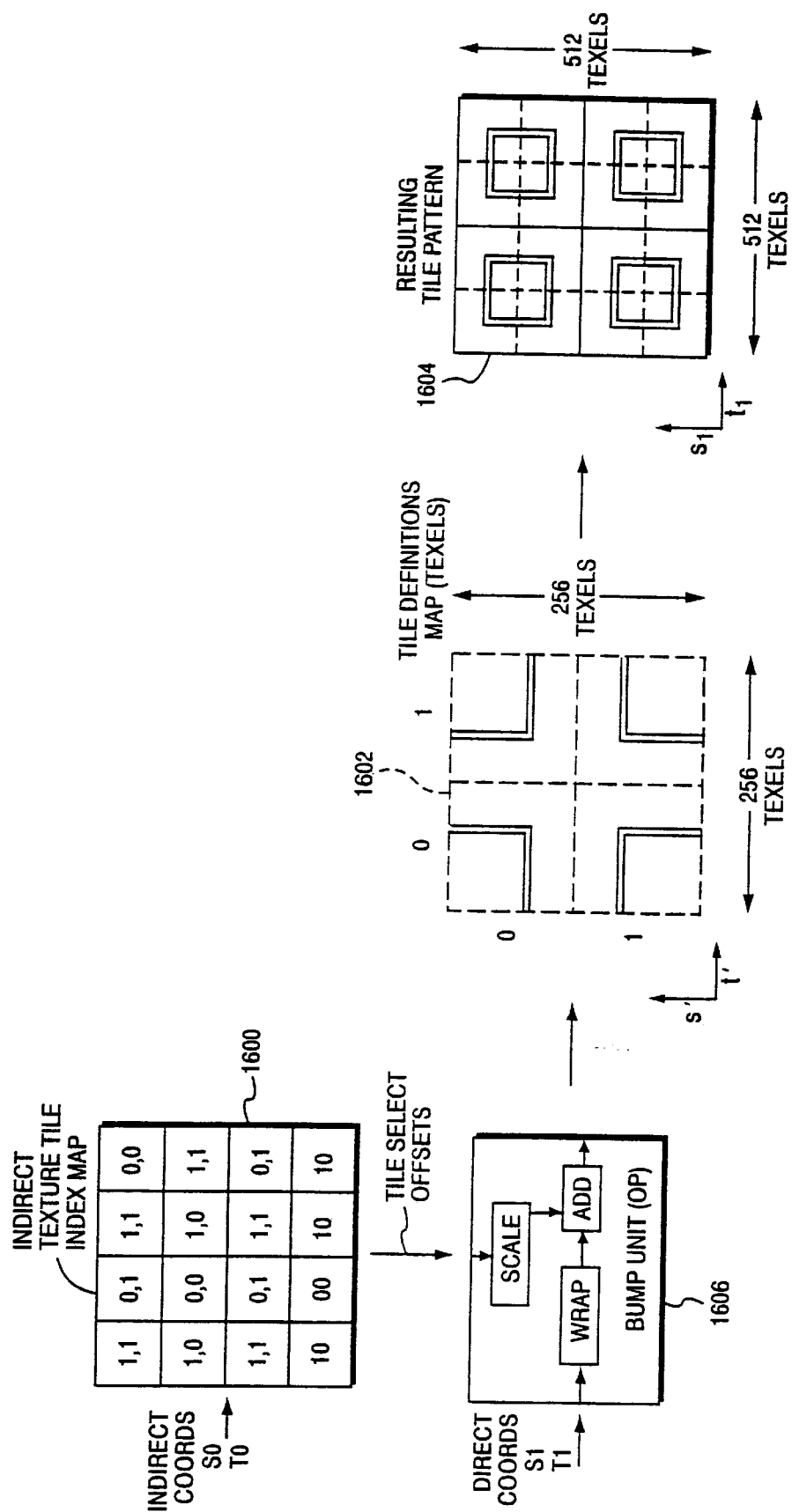
FIGS. 20a–20c show three examples of the first tiling method of the instant invention.

FIG. 20a shows a first example of the indirect tiling method of the instant invention. As shown in FIG. 20a, a texture tile index map 1600 is defined which identifies specific tiles in a tile definitions map 1602 for each tile location on a resulting texture 1604. In this example, a two dimensional (2×2) tile definitions map 1602 is used. Thus, the tile definition map includes four tiles which, in this example, each comprise a different and complimentary portion of a larger intended texture pattern. In this example, the resulting pattern 1604 is 512×512 texels in size. The indirect tile index map 1600 is a 4×4 matrix, wherein each matrix element identifies one of the four tiles in the tile definitions map 1602. Each tile in the tile definitions map is 128×128 texels in size. Thus, by using each of the 16 indexes in the index map 1600 to map a tile, the resulting image 1604 will include 16 tiles (512×512 texels) in the desired configuration as determined by the tile index map. As can be seen in FIG. 20a, the resulting tile pattern 1604 in this example includes a pattern containing four squares made up of 16 texture tiles.

As explained above, certain scaling, wrapping and/or adding operations are performed on the direct and indirect coordinates as indicated by the bump unit (OP) block 1606 in FIG. 20a. In this example, the indirect texture is initially scaled down by dividing the indirect texture coordinates by 128 (the dimension of the tiles) in order to address the 4×4 index matrix 1600 and obtain the offsets for the particular texture coordinates. The offsets are then scaled up by multiplying the offsets by 128 (the dimension of the tiles). The scaled up offsets are then combined with the results of the wrapping operation on the texture coordinates in order to obtain the modified texture coordinates for use in obtaining a texture from the tile definitions map 1602.

Figure 20B:
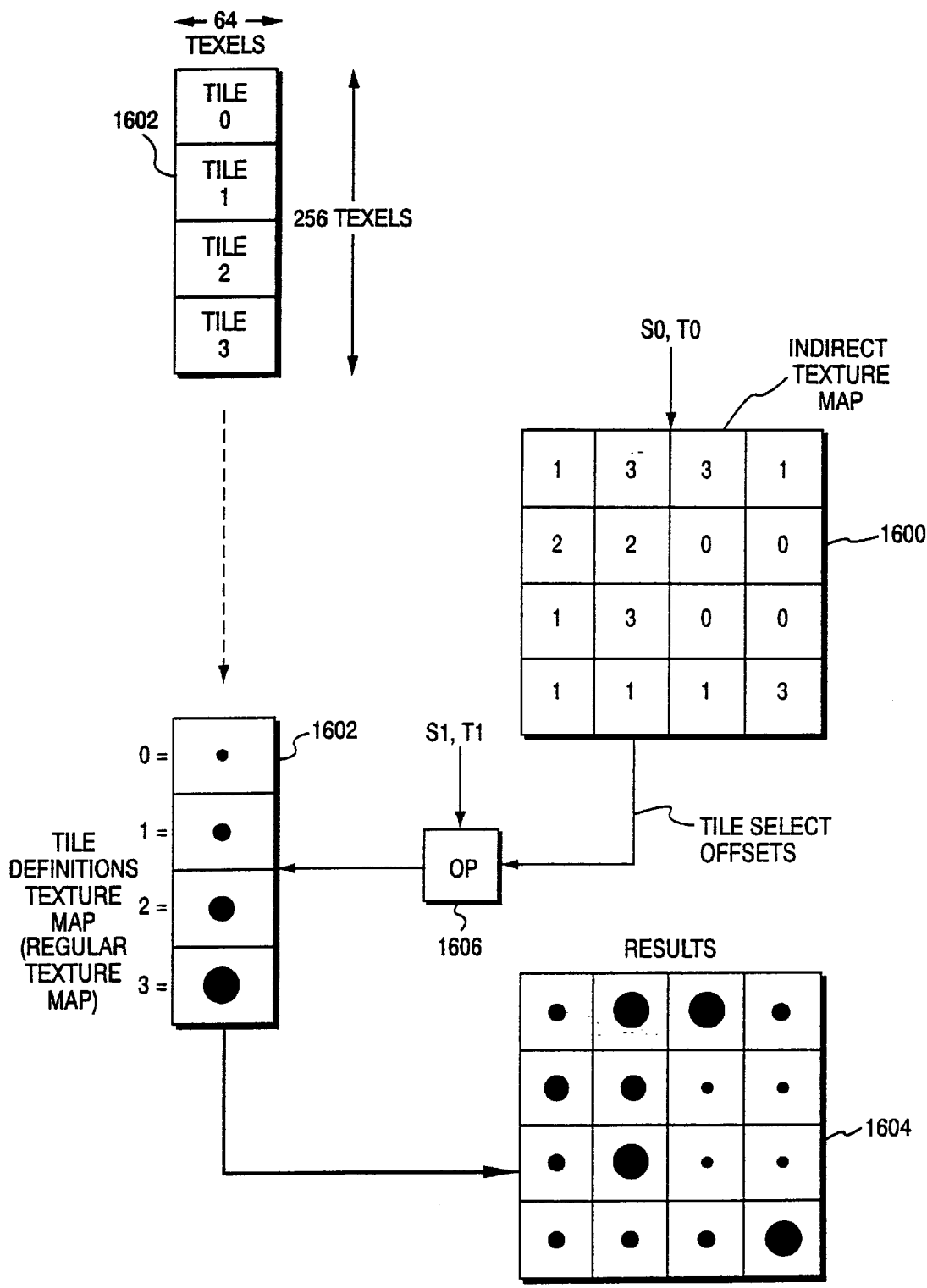

FIG. 20b shows a second example of the indirect tiling method of the present invention, wherein like reference numerals correspond to similar parts as described above. In this example, the tile definitions map 1602 is a one dimensional map instead of the two dimensional map as used in the first example of FIG. 20a. As a result, the indirect texture map 1600 only uses single offset values rather than a pair of offsets values as in the first example. Thus, the particular offset value selected can be used to modify either the wrapped S1 or T1 values (S1 in this example), depending on how the tile definitions map is constructed (vertically or horizontally stacked). In this example, the textures tiles are 64×64 tiles in size. Thus, the wrapping and scaling parameters used in the bump unit 1606 (OP) are 64 rather than 128 as in the first example. It is noted that any suitable size texture tiles can be used depending on the particular application in which the invention is used. In addition, any suitably sized indirect texture map and resulting texture can be defined using the instant invention.

Figure 20C:
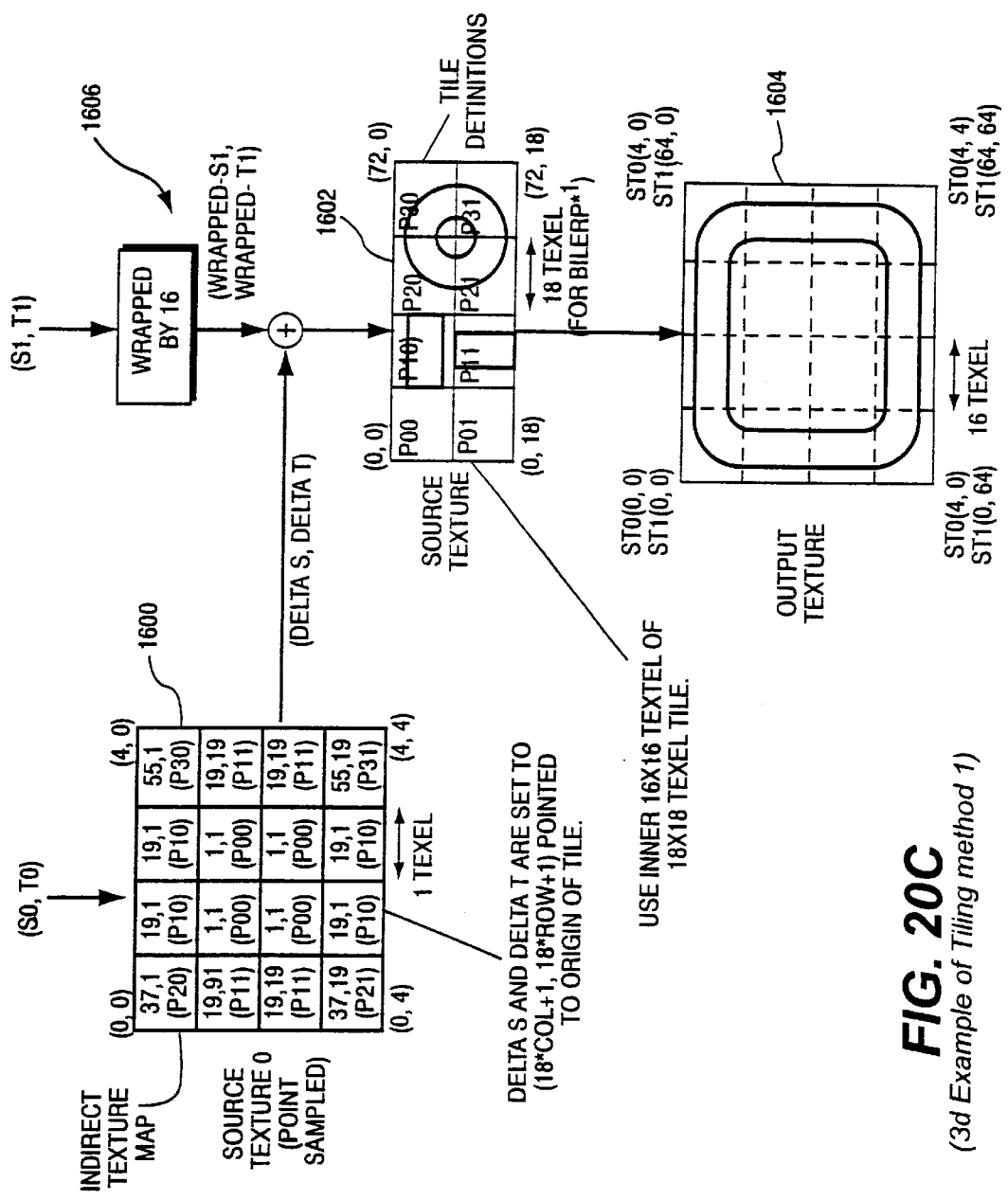

FIG. 20c shows a third example of the indirect tiling method of the present invention, which again uses like reference numerals to designate similar parts as described above. This example uses a 2×4 tile definitions map 1602 containing eight 18×18 texel tiles. The indirect tile index map 1600 is similar to the index map of the first example above. In this example, however, only the inner 16×16 texels of the 18×18 texel tiles are used in creating the resulting tile pattern 1604. Thus, as this example demonstrates, any suitable tile size can be used, regardless of the size of the tile definitions.

Figure 21:
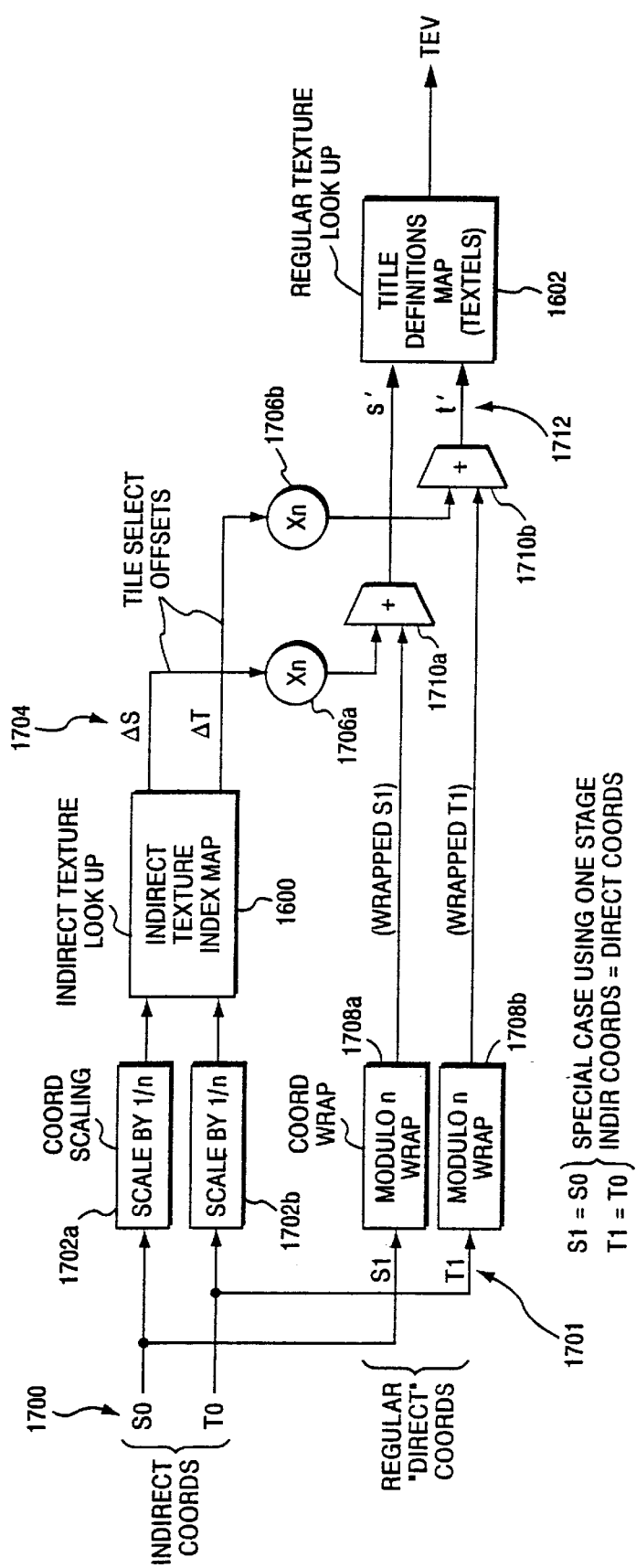
FIG. 21 is an example logical block diagram of the first tiling method of the instant invention.

FIG. 21 shows a logical block diagram of the exemplary indirect tiling method described above with respect to FIGS. 19 and 20a–20c. As can be seen in FIG. 21, the instant tiling method can take advantage of using the same initial texture coordinates for the direct coordinates and the indirect coordinates (i.e. S1=S0 and T1=T0). However, other arrangements are possible where the coordinates are not the same. For example, indirect texture coordinates may be used which do not need to be scaled in order to properly address the tile index map. However, when the same texture coordinates are used, as in this example, the indirect texture coordinates 1700 (S0,T0) are first scaled, as indicated by scaling blocks 1702a and 1702b, in order to conform to the scale of the indirect texture index map 1600. The properly scaled indirect coordinates are then used to perform a look up operation in the tile index map in order to obtain the tile select offsets 1704 (ΔS, ΔT). For tiling the desired texture coordinate scale is the tile size multiplied by the size of the indirect tile index map. The tile size is then divided out for use in accessing the indirect map.

The tile select offsets are scaled up to the original scale to correspond with the scale of the direct texture coordinates, as indicated by multipliers 1706a and 1706b. The offsets are then ready to be combined with the regular texture coordinates 1701 (S1, T1), after the direct coordinates are wrapped, as indicated by the modulo n wrapping blocks 1708a and 1708b. The wrapped direct coordinates and the scaled offsets are then combined by adders 1710a and 1710b, thereby producing the modified texture coordinates 1712 (S',T'). The modified texture coordinates are then used to perform the regular textures look up in the tile definition map 1602, thereby selecting a tile for output as a texture to the TEV unit. It is noted that the logical block diagram of FIG. 21 shows an embodiment where offsets are provided for both the S1 and T1 coordinates which, in this example, enables a two dimensional tile definitions map to be used. However, other arrangements are possible in accordance with the invention where only a one dimensional tile index map is used, such as in the example of FIG. 20b.

Example Pseudo 3D Texture Tiling (Second Tiling Method)

Figure 22:
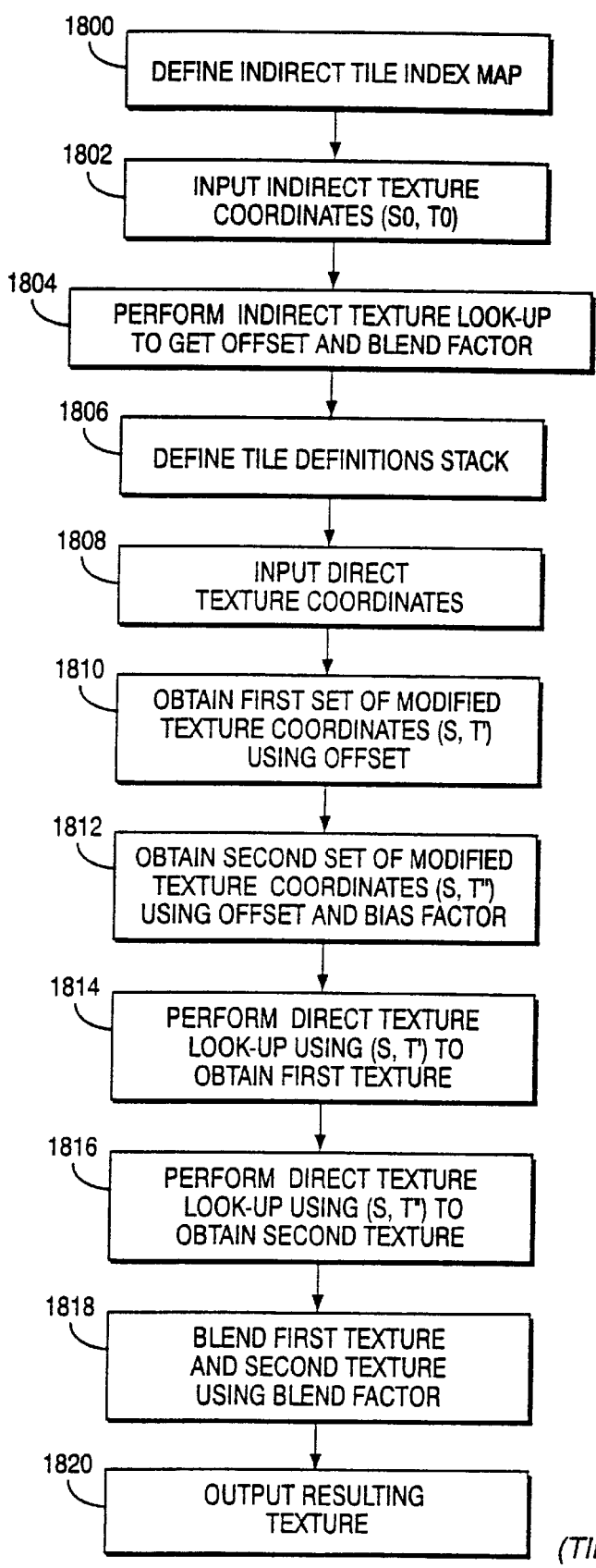
FIG. 22 is a flowchart of the second tiling method of FIG. 14b.

FIG. 22 shows a more detailed block diagram of the second indirect tiling method of the instant invention (see FIG. 18b), which is referred to herein as pseudo 3D textures. This second method enables multiple indirectly indexed tiles to be blended together to form synthetic tiles that are mapped onto a surface. In other words, in this method the tiling mapping can be extended to provide a pseudo-3D effect. In this method, all of the tiles are considered to be part of a stack. Rather than selecting a single tile from the tile definitions map, as in the first example above, in this example, one can select multiple tiles (2 adjacent tiles in the example below) and blend the tiles together in order to produce a synthesized texture tile. This technique can be used, for example, to cover a large surface with non-repeating patterns that blend smoothly together. By allowing blending of texture tiles, the programmer is not limited to specific tiles in a tile definitions map when covering a surface. Instead new tiles can be synthesized from existing tiles in order to greatly increase the number of possible texture tiles that can be used to cover a surface, without requiring larger texture definition maps. By using synthesized tiles, the appearance of repeating texture patterns can by avoided, thereby improving the realism of the image. This method can be used, for example, to cover a beach with a tiled texture where the layers vary in appearance from fine sand to small pebbles to large rocks. The blending feature can be used to provides a pseudo-3D appearance for the resulting texture.

As shows in FIG. 22, a indirect tile index map is defined which includes indexes to tiles in the tile definitions stack (block 1800). Indirect texture coordinates are defined (block 1802) to obtain a texture select offset and a blending factor (block 1804). The texture tile definitions are defined in the form of a stack (block 1806). If pseudo-3D effects are desired, the tiles are preferably defined, in this example, such that adjacent tiles will blend well together to provide a layering effect, as will be further understood from the description below. Of course, as explained above, the indirect coordinates may be scaled prior to performing the indirect look up operation, such as when the one desires to have the indirect coordinates equal to the direct coordinates.

Direct coordinates are defined (block 1808), and are combined with the offset to produce a first set of modified texture coordinates (s, t') (block 1810). The offset is then modified (biased) in a predetermined manner, such as by incrementing the offset by one tile, and a second set of modified texture coordinates (s, t'') (block 1812) is then defined by combining the modified offset with the direct texture coordinates. A first texture is then looked up in the tile definitions stack using the first set of modified texture coordinates (s,t') to obtain a first texture tile (block 1814). A second texture is then looked up in the tile definitions stack using the second set of modified texture coordinates (s,t''') to obtain a second texture tile (block 1816). The first and second texture tiles are then blended to create a synthesized texture (block 1818). In this example, the blending factor for use in the blending operation is obtained along with the tile select offset(s) from the tile index map. The synthetic texture is then output for display (Block 1820) (or possibly for use in further texture processing operations).

Figure 23:
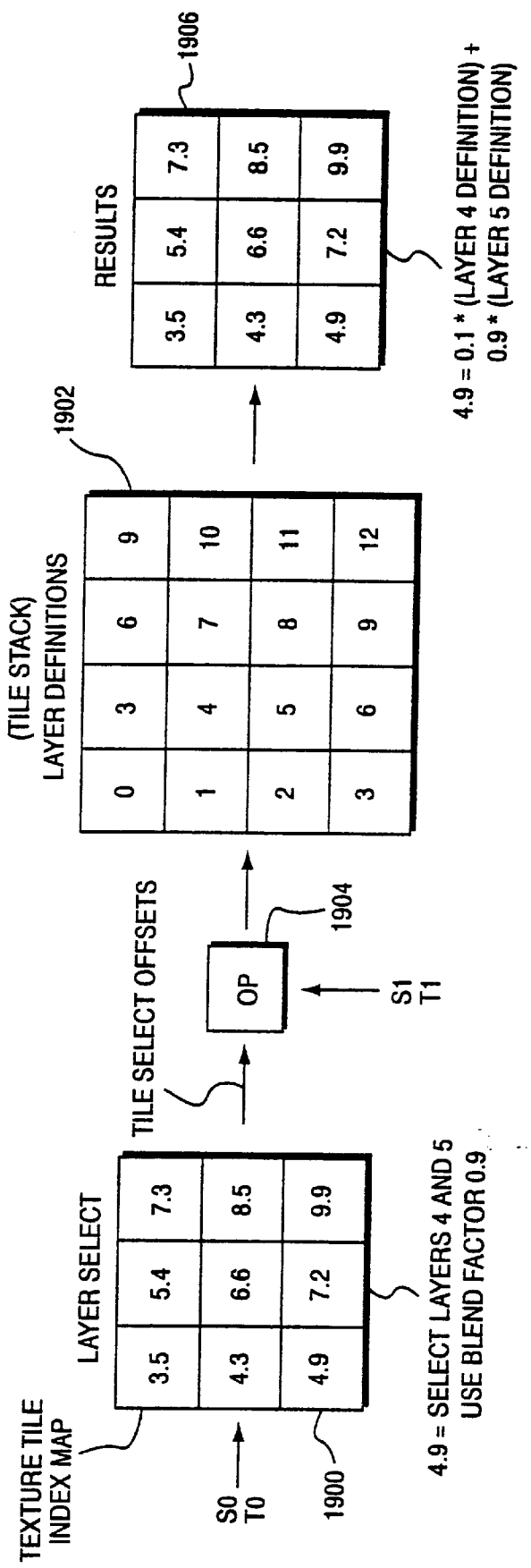
FIG. 23 is an example of the second tiling method of the present invention.

FIG. 23 shows an example of the pseudo-3D texturing method of the instant invention. In this example, the texture tile index map 1900 includes indexes to the tile stack 1902 as well as a blending factor. Specifically, in this example, the tile index map includes indexes including an integer component and a fraction component. For example, the lower left hand corner element in the index map 1900 is "4.9". In this example embodiment, the integer component (i.e. "4") provides the layer select offset, and the fractional component (i.e. "0.9") provides the blending factor. Thus, the indirect texture coordinates are used to look up a layer select offset and a blending factor. The offset is then scaled (if necessary for the particular implementation) and combined with the direct texture coordinates (after being wrapped), using bump block 1904, to produce a first set of modified texture coordinates. The first set of modified texture coordinates are then used in a look up operation in the tile definition stack 1902 to obtain a first texture tile. The bump unit also generates a second set of modified coordinates by performing a biasing operation on the tile select offset and combining the biased offset with the wrapped direct texture coordinates. The biasing operation may simply increase the offset by a given amount, such as by one tile, or it may perform any other suitable operation in the offset so that the resulting tile will be different from the resulting tile without the biasing. The second set of modified texture coordinates are then used to look up a second tile from the tile definitions stack 1902. The two selected tiles are then blended together using the blending factor provided by the indirect index tile index map 1900, thereby producing a synthesized texture tile for use in the resulting texture 1906. In this example, the resulting texture 4.9 indicates that the layer definition 4 and layer definition 5 are blended together using a blending factor 0.9, i.e. 4.9=0.1* (layer 4 definition)+0.9* (layer 5 definition). It is noted that in this example, a only one offset is provided. Thus, in this example, the tile definitions map is treated as a one dimensional stack and the offset is used to modify the S1 or T1 component of the direct texture coordinates. Other arrangements are possible where the index map provides a pair of offsets, as well as a blending factor. In other embodiments, the blending factor may be a constant or otherwise defined in a manner other than by the tile index map 1900. However, by enabling the blending factor to be programmed into the tile index map, different blending factors can be conveniently defined to create large variety of synthetic tiles. It is also noted that in this example, the bias factor for the offset is one tile. Thus, once the primary tile is defined, the secondary tile is defined as the next tile in the stack. Other arrangements are possible where the bias causes the second tile to have a different relationship to the first tile.

Figure 24:
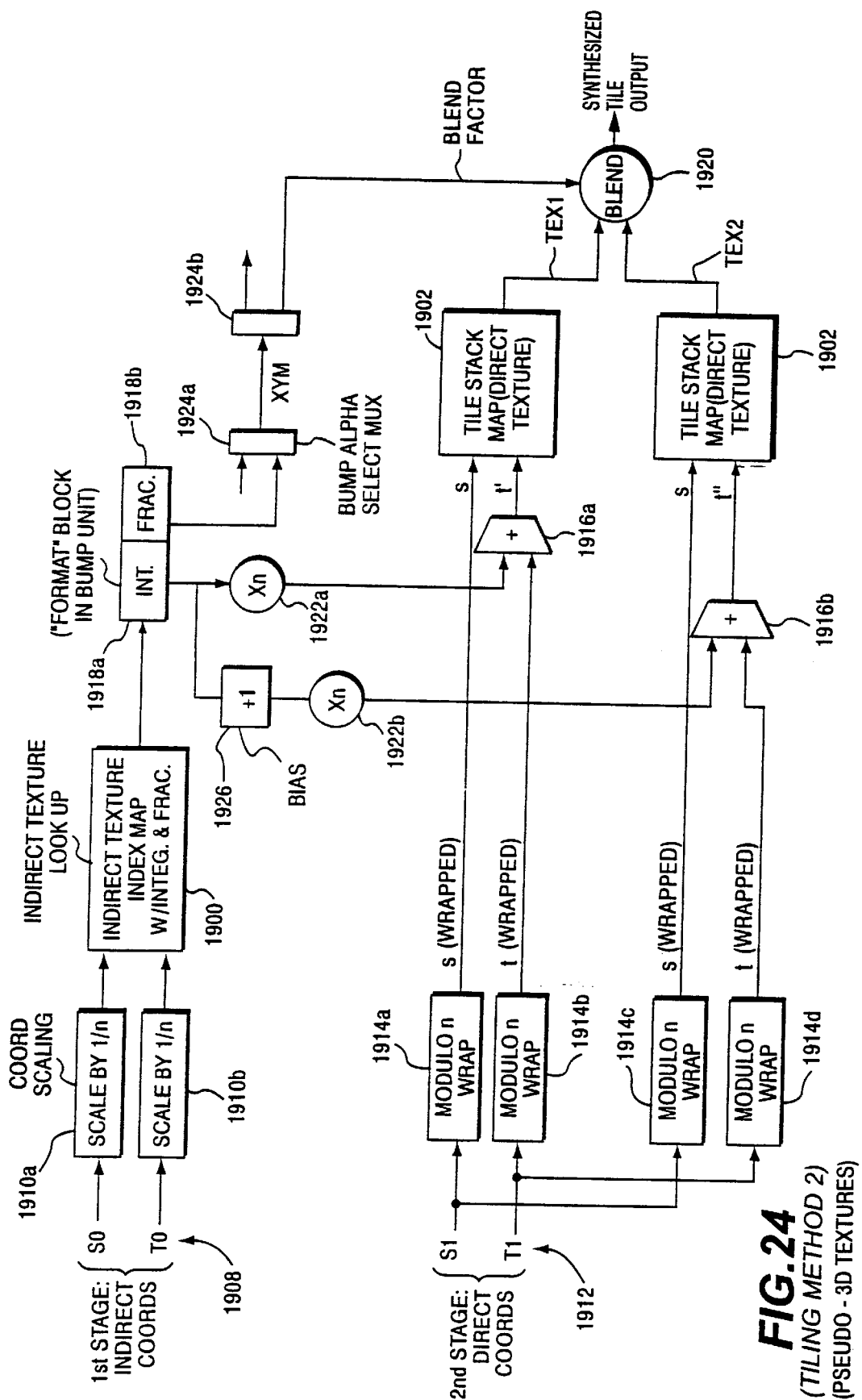
FIG. 24 is an example logical block diagram of the second tiling method of the instant invention.

FIG. 24 shows and exemplary logical block diagram of this second tiling method described above in connection with FIGS. 22 and 23. As shown in FIG. 24, the indirect coordinates (S0, T0) are determined and then appropriately scaled, as indicated by scaling blocks 1910a and 1910b. The scaling is done for the same reasons explained above in connection with the first method of the invention. This example also takes advantage of using the same values for the direct and indirect texture coordinates However, as explained above, other arrangements are possible and the scaling operations can be adjusted or eliminated depending on the particular implementation. In this example, the scaled indirect coordinates 1908 (S0,T0) are used to perform a look up operation in the indirect texture index map 1900 in order to obtain an integer 1918a representing a tile select offset and a fraction (1918b) representing a blending factor. The integer (offset) is then rescaled, as indicated by multiplier 1922, and sent to adder 1916a for use as a modifier for the direct texture coordinates. The direct texture coordinates 1912 (S1,T1) are wrapped, as indicated by modulo n wrap blocks 1914a and 1914b. The offset is then combined with the t component of the wrapped coordinates to produce a first set of modified texture coordinates (s,t'), which are then used to perform a look up in the tile definitions stack 1902 to obtain a first texture tile (Tex1).

The tile select offset provided by the integer 1918a is also used to obtain a second set of modified texture coordinates. This is done by biasing the offset, as indicated by block 1926. In this example, the biasing involves adding 1 to the offset prior to resealing the offset at multiplier 1922b . The biased offset is then sent to adder 1916b. The biased offset is combined with the wrapped t component of the direct texture coordinates by adder 1916b in order to produce a second set of modified texture coordinates (s, t"). The second set of modified texture coordinates are then used to perform a second look up in the tile definitions map 1902 in order to obtain a second texture tile (Tex2).

The first texture tile (tex1) and the second texture tile (text2) are then sent to the blending block 1920. The fraction component (1918b) obtained from the indirect texture index map 1900 is sent through multiplexers 1924a and 1924b for delivery to the blending block 1920. Thus, the blender then has the two texture tiles and the appropriate blending factor. A blending operation is then performed to combine the two texture tiles based on the blending factor to produce a synthesized tile for output to the display (or possibly for use in a further texture processing operation).

Example API Indirect Texture Tiling Function Commands

Figure 7A:
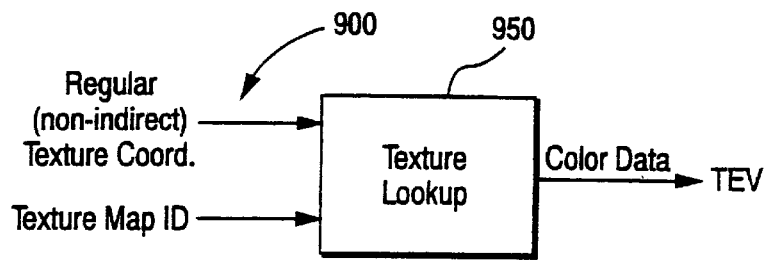
FIG. 7A is a functional block diagram illustrating a simple basic example of a regular (non-indirect) texture lookup.
Figure 7B:
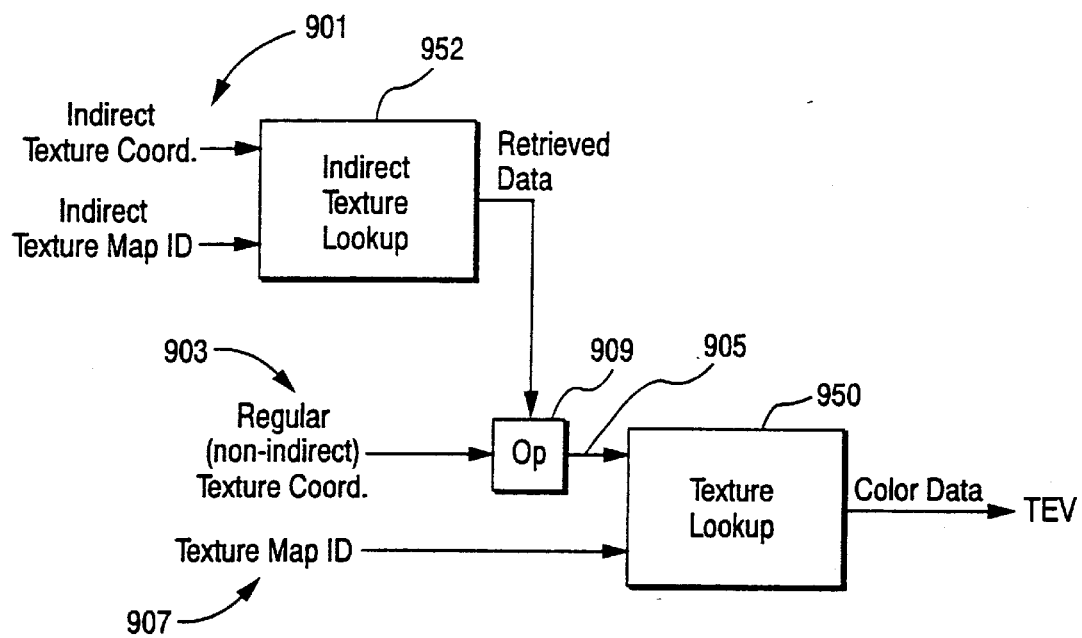
FIG. 7B is a functional block diagram illustrating a simple basic example of an indirect texture lookup in accordance with the present invention.
Figure 8:
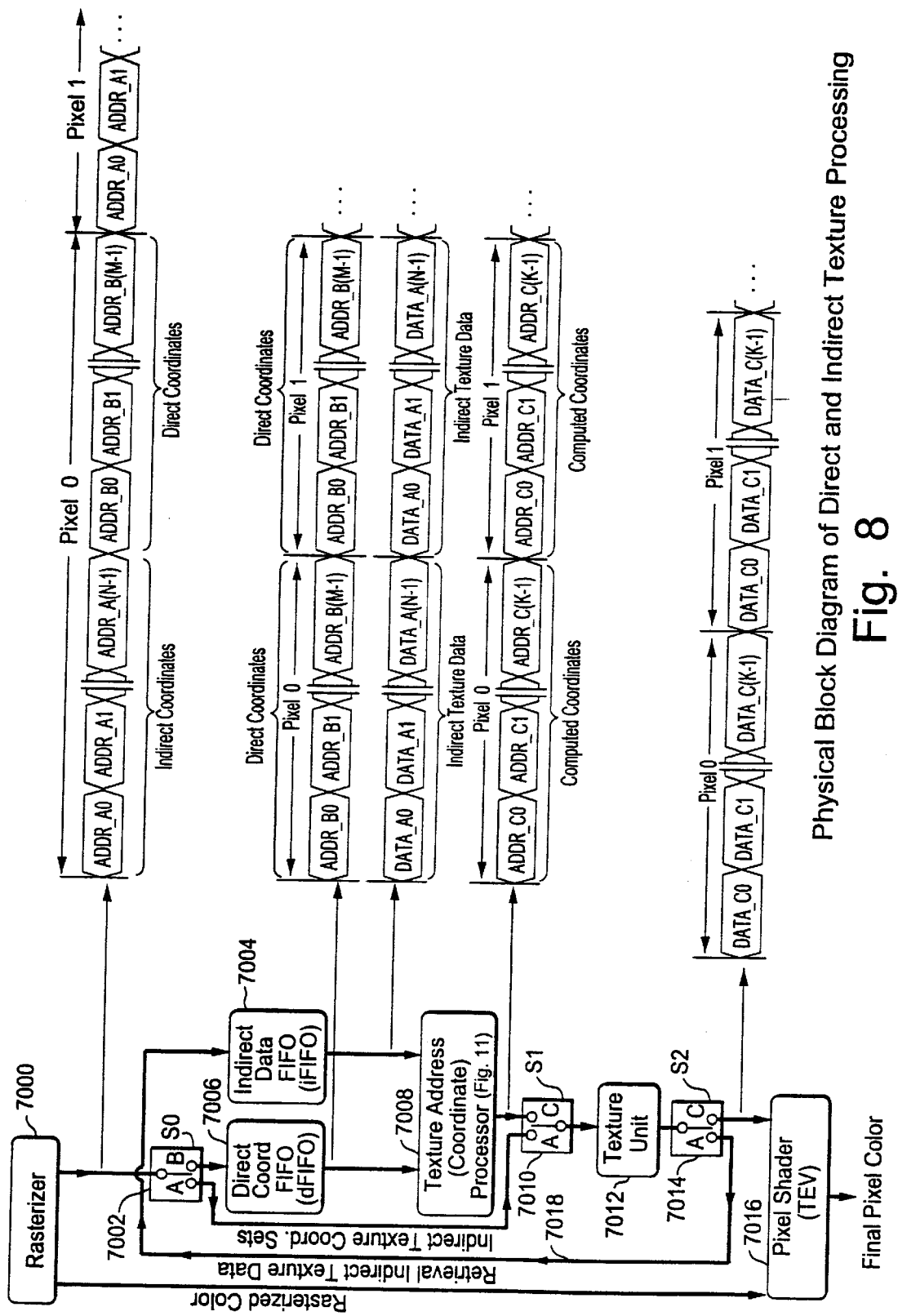
FIG. 8 is a block diagram illustrating an overview of an example physical configuration for implementing indirect texture processing in accordance with the present invention.
Figure 9:
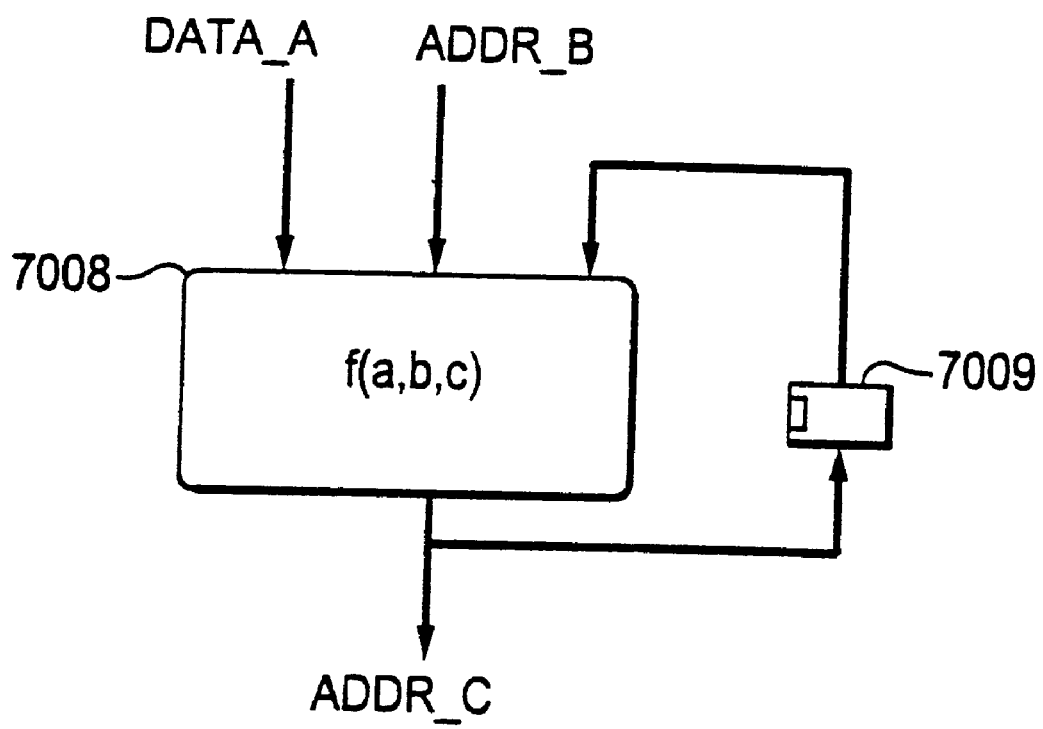
FIG. 9 is a block diagram illustrating a logical overview of the texture address (coordinate/data) processor operation.
Figure 10A:
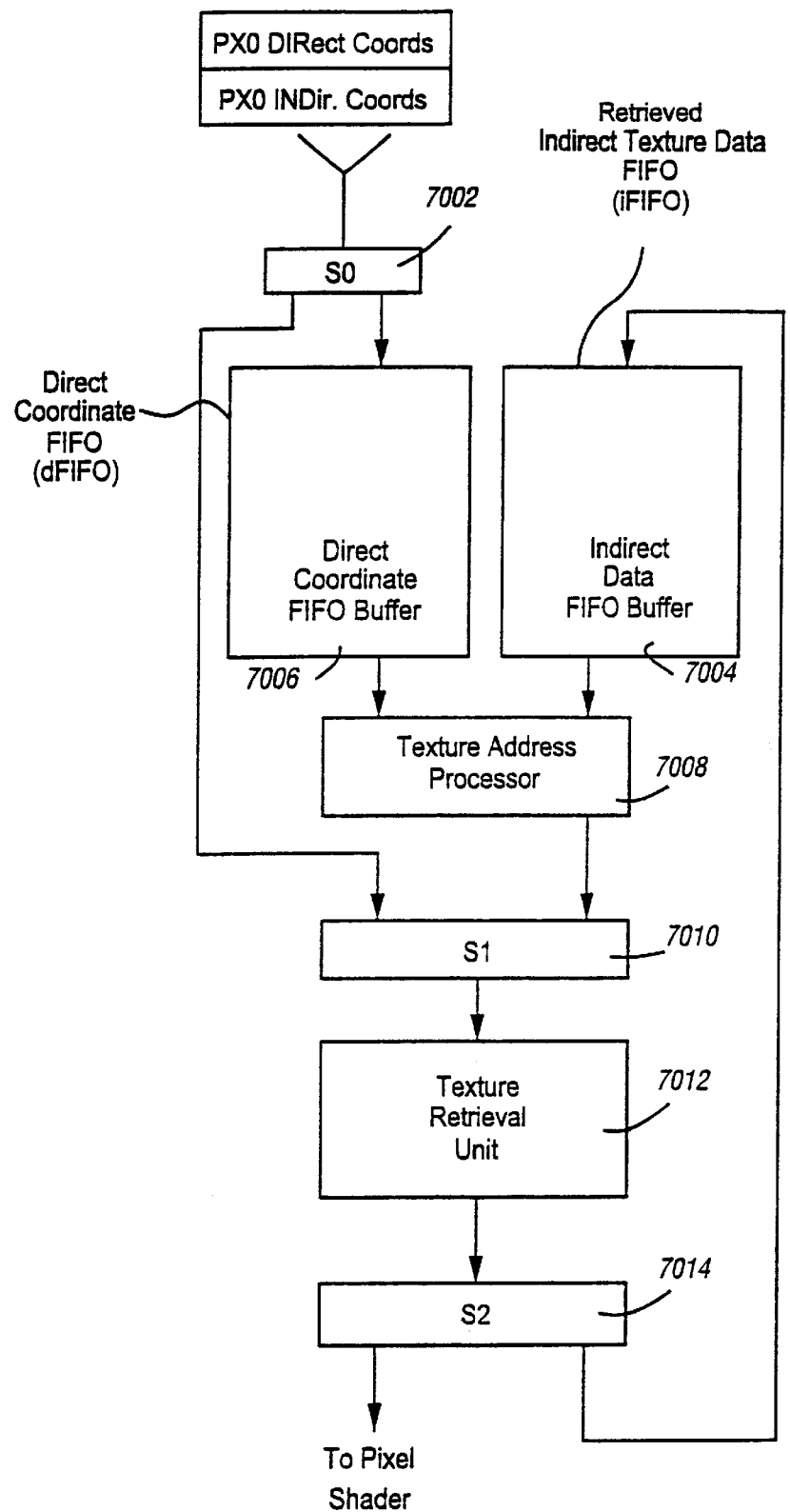
FIGS. 10A–10K are a series of block diagrams illustrating the relative progression of pixel direct coordinate data and pixel indirect texture data in the example texturing pipeline implementation as a result of interleaved direct and indirect texture processing.
Figure 10B:
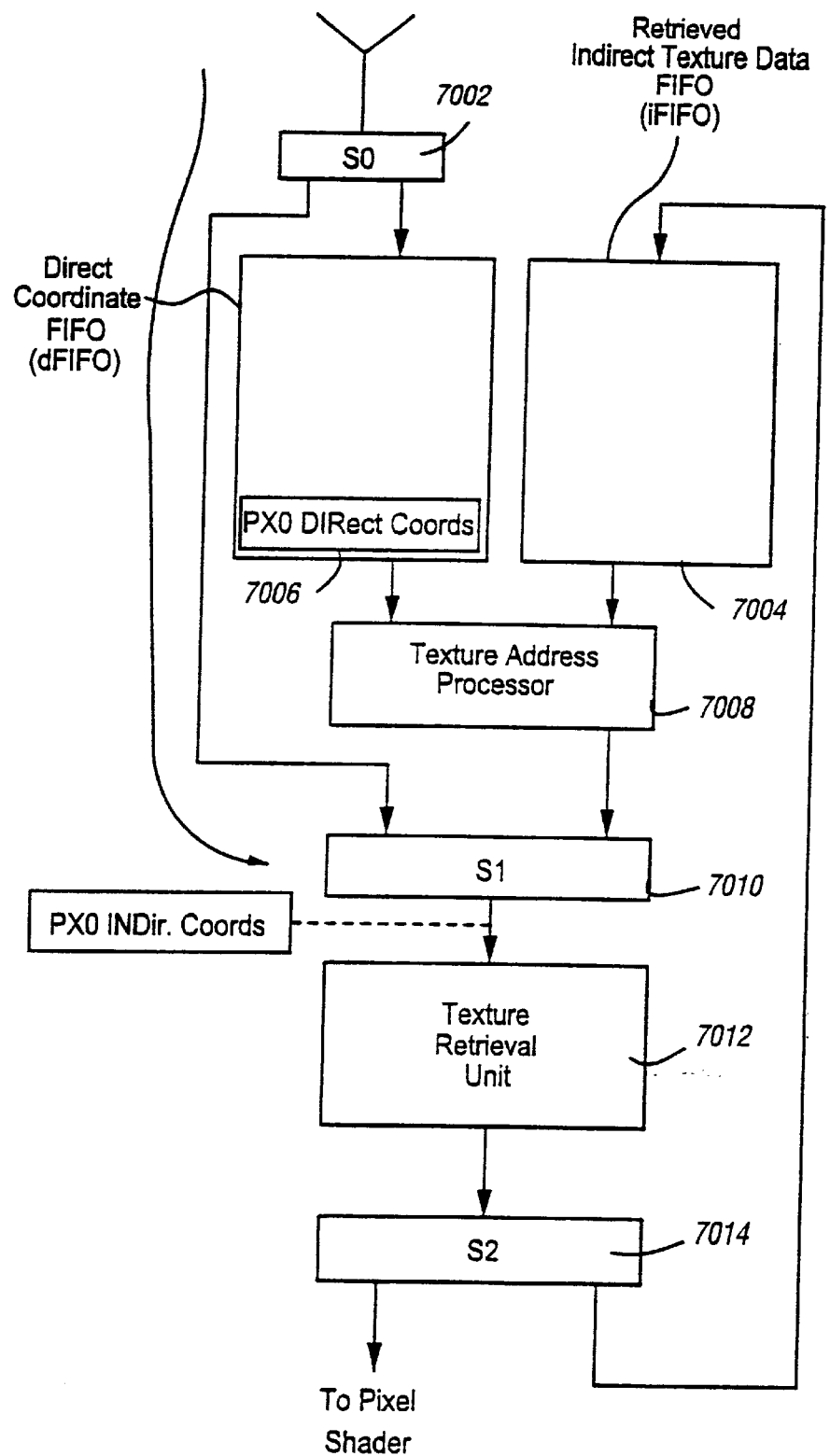
Figure 10C:
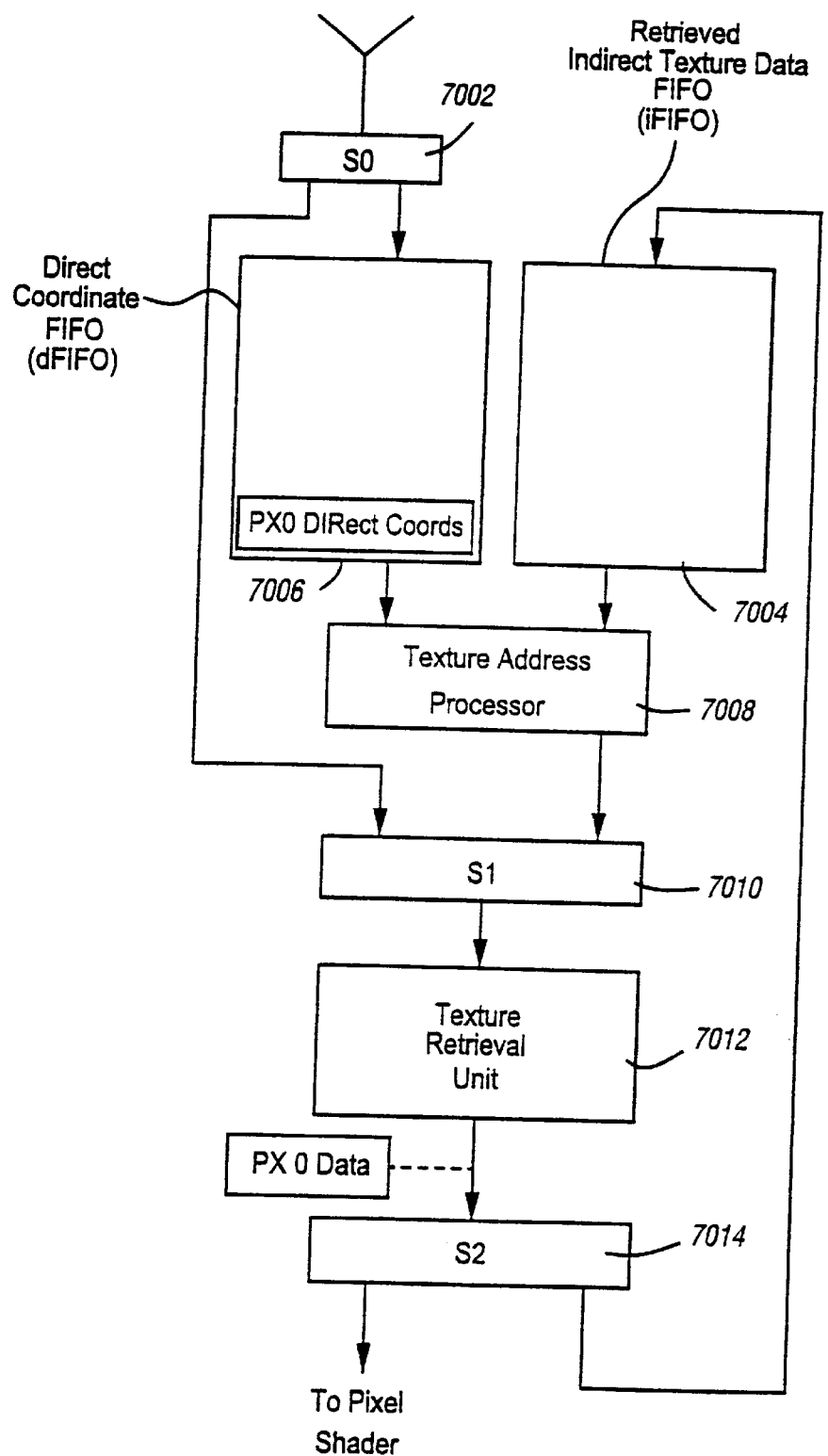
Figure 10D:
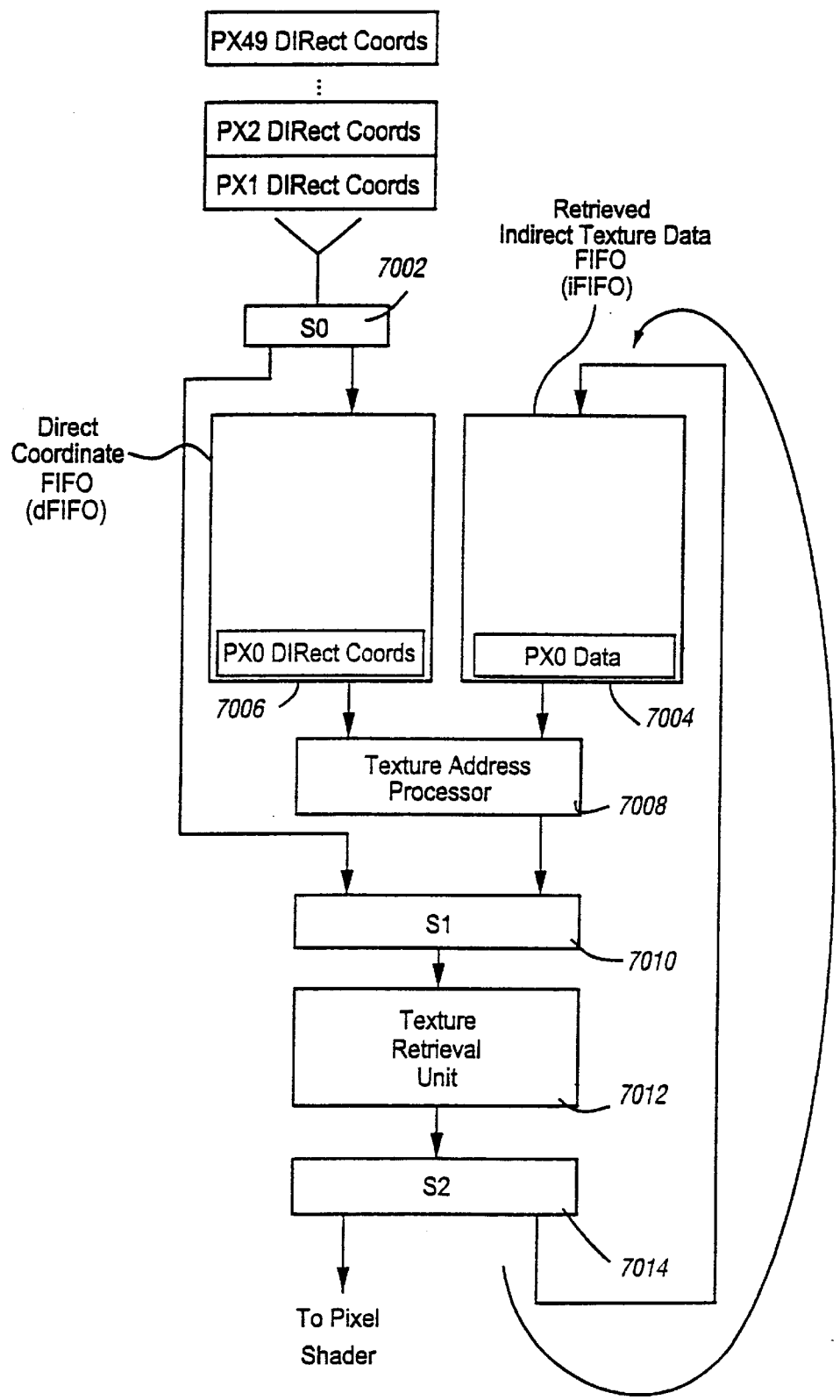
Figure 10E:
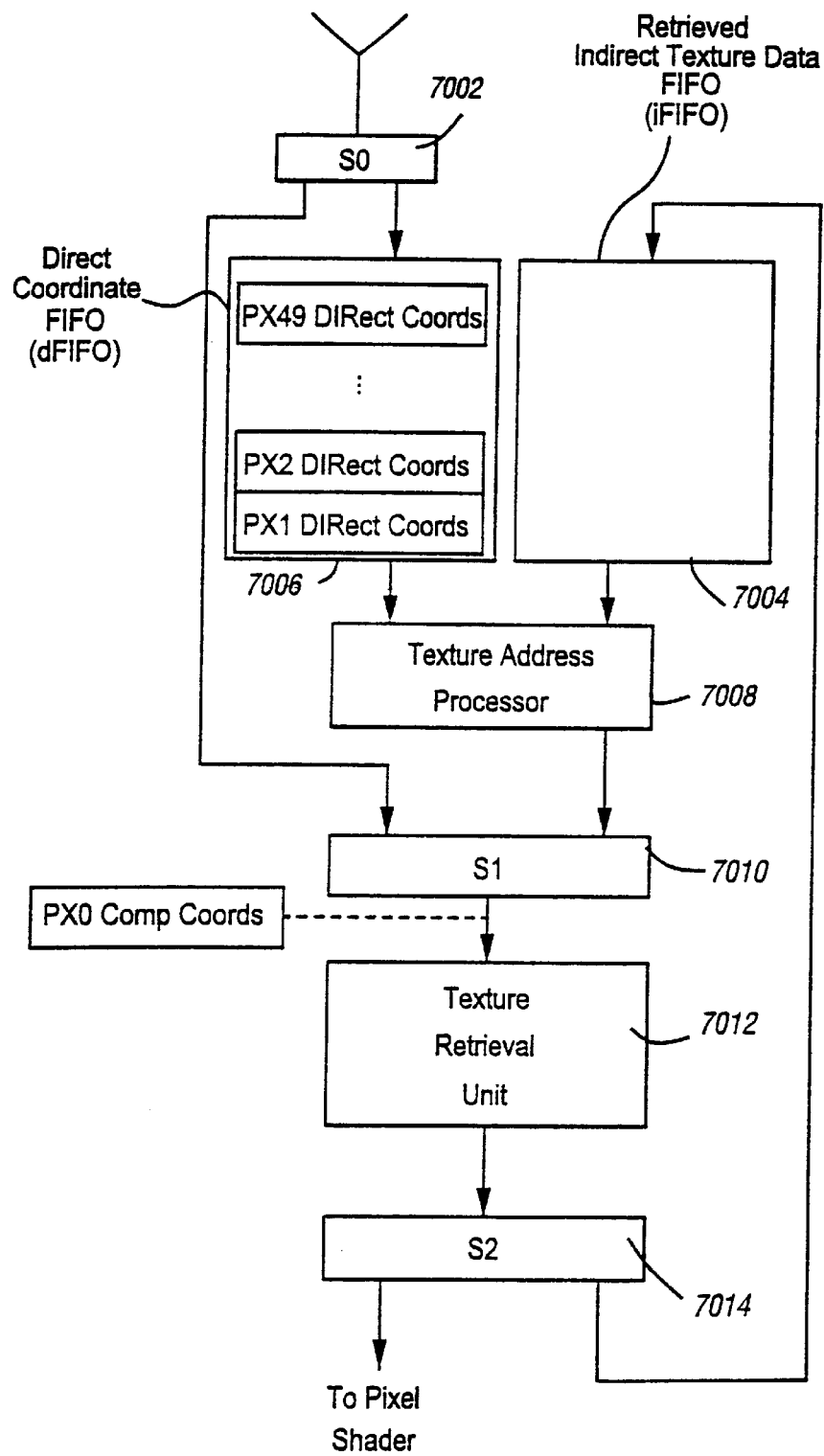
Figure 10F:
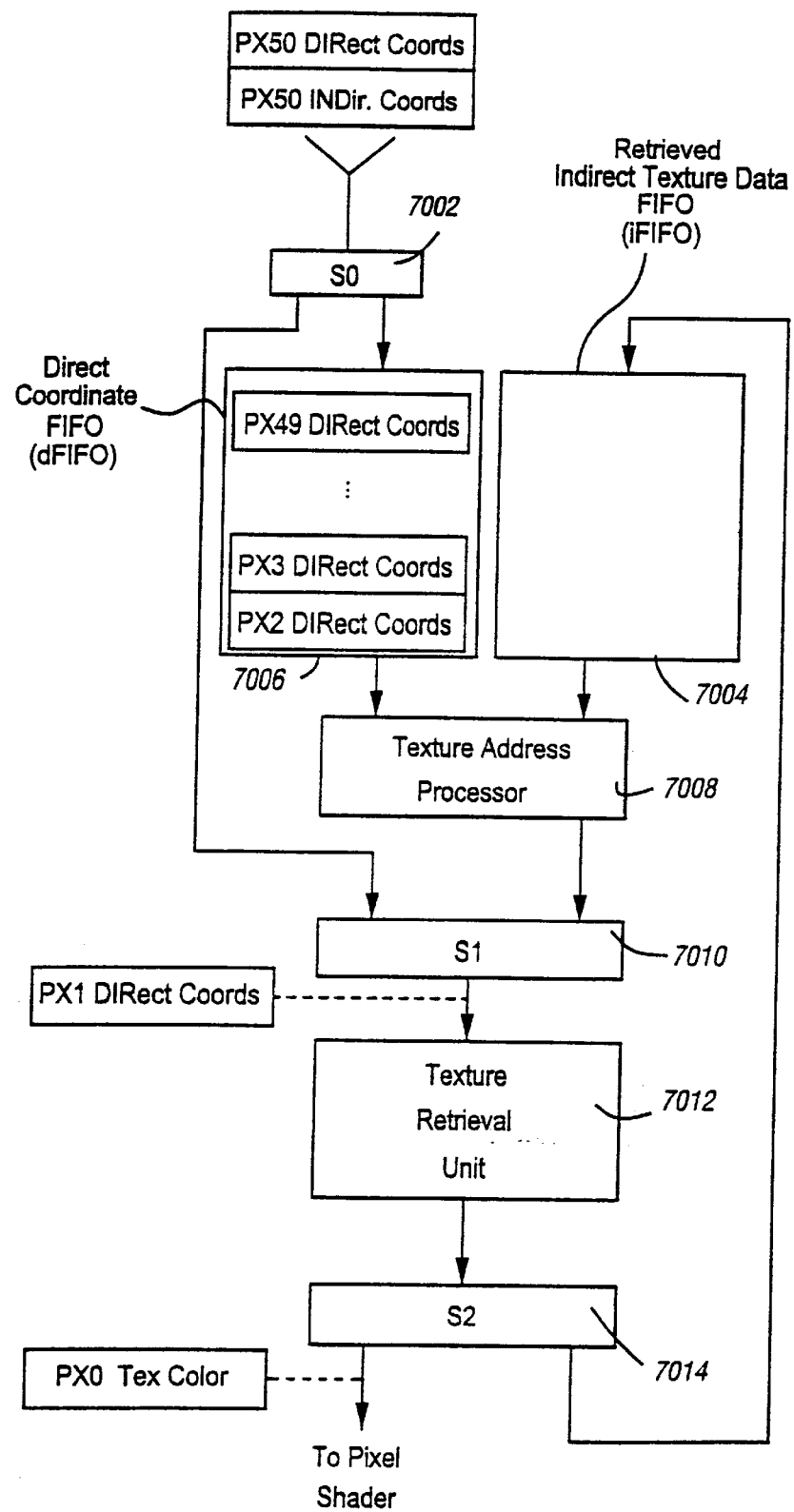
Figure 10G:
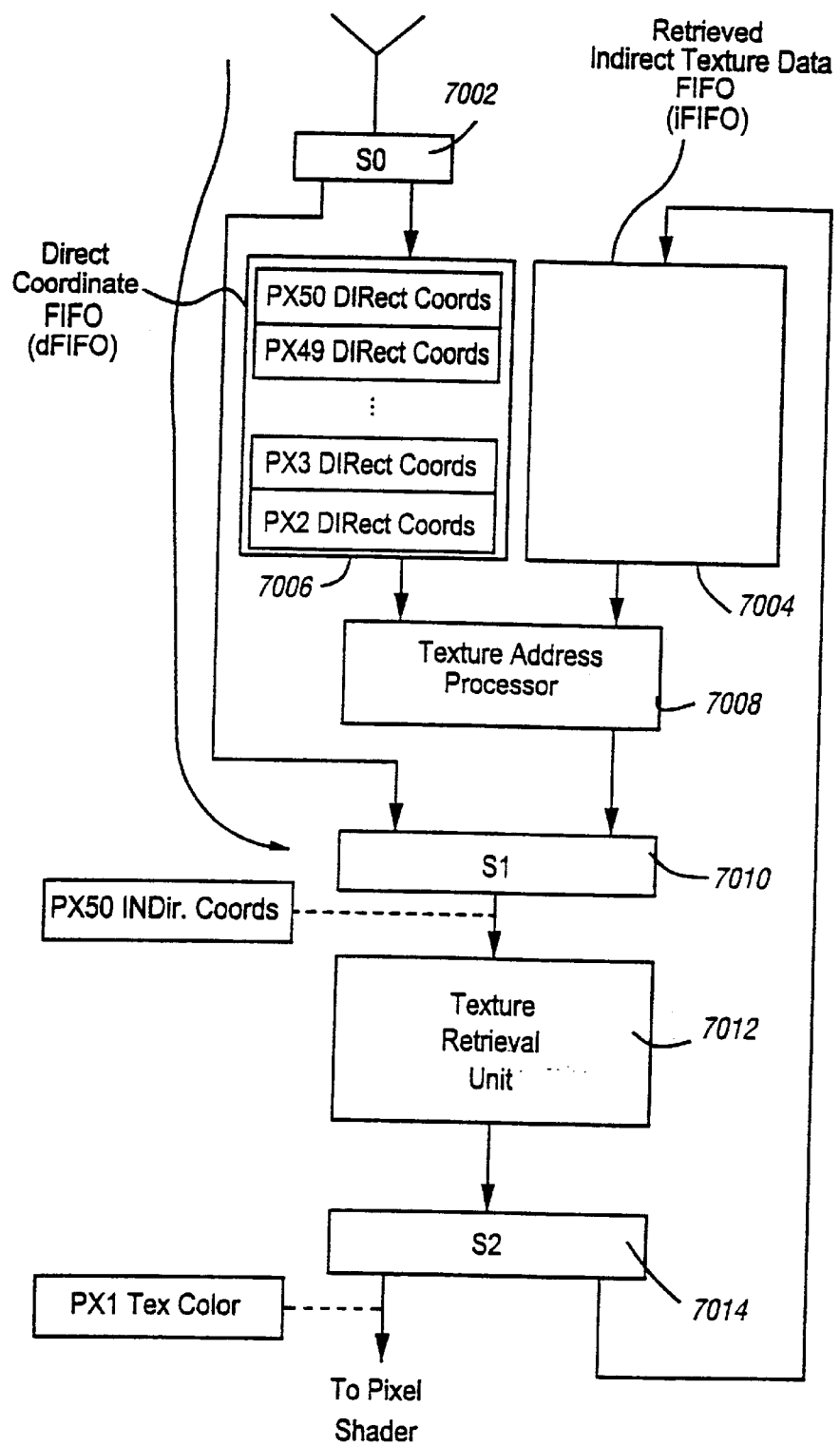
Figure 10H:
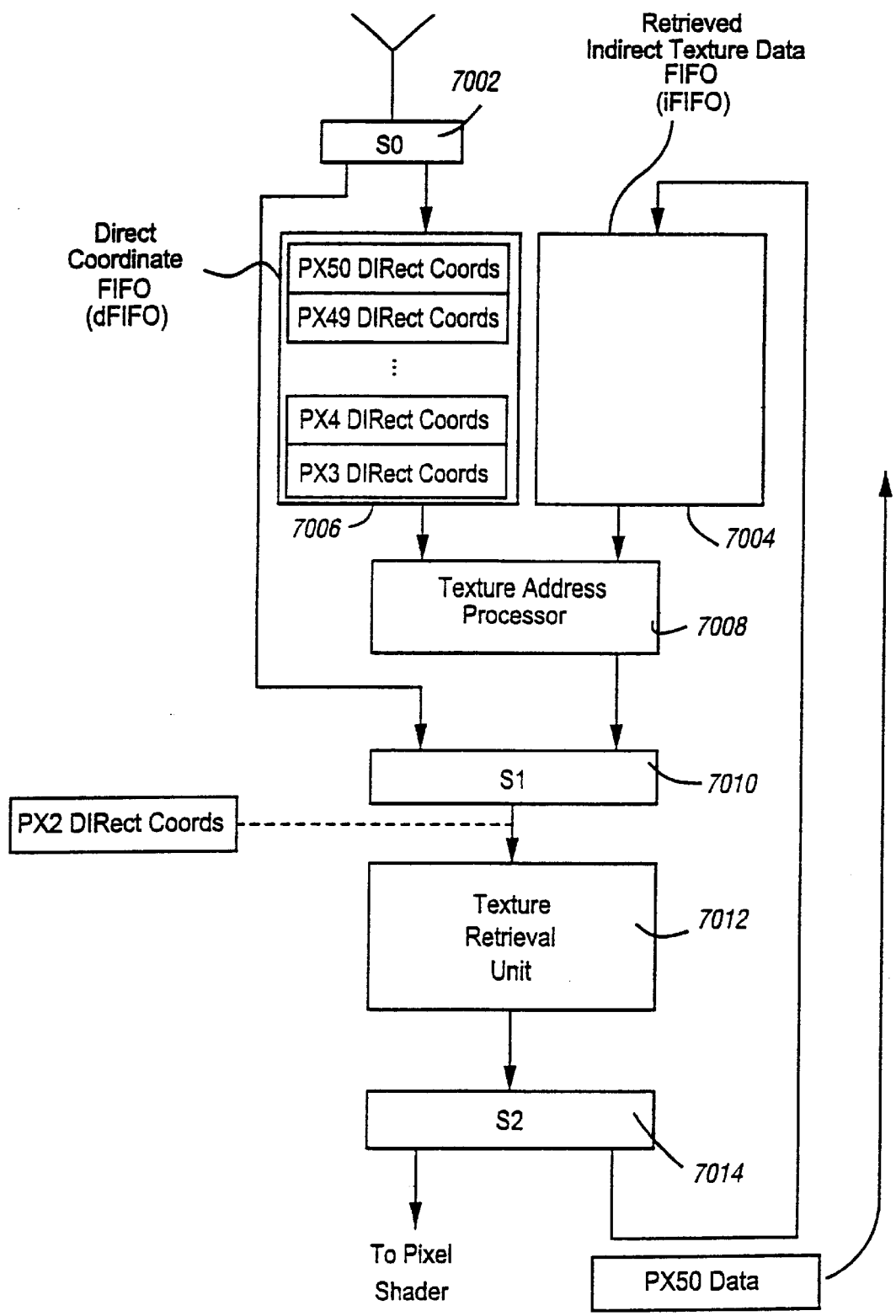
Figure 10I:
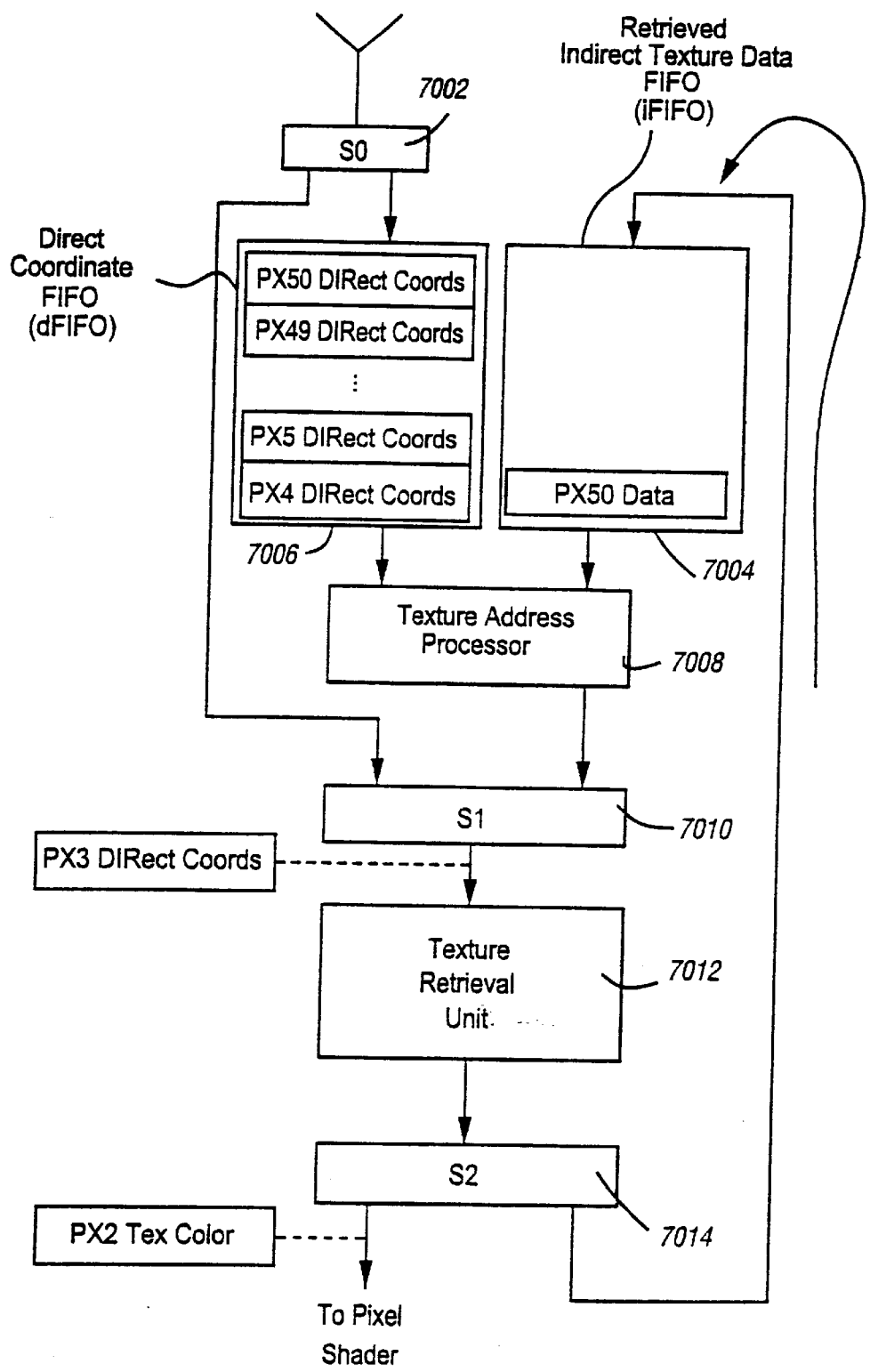
Figure 10J:
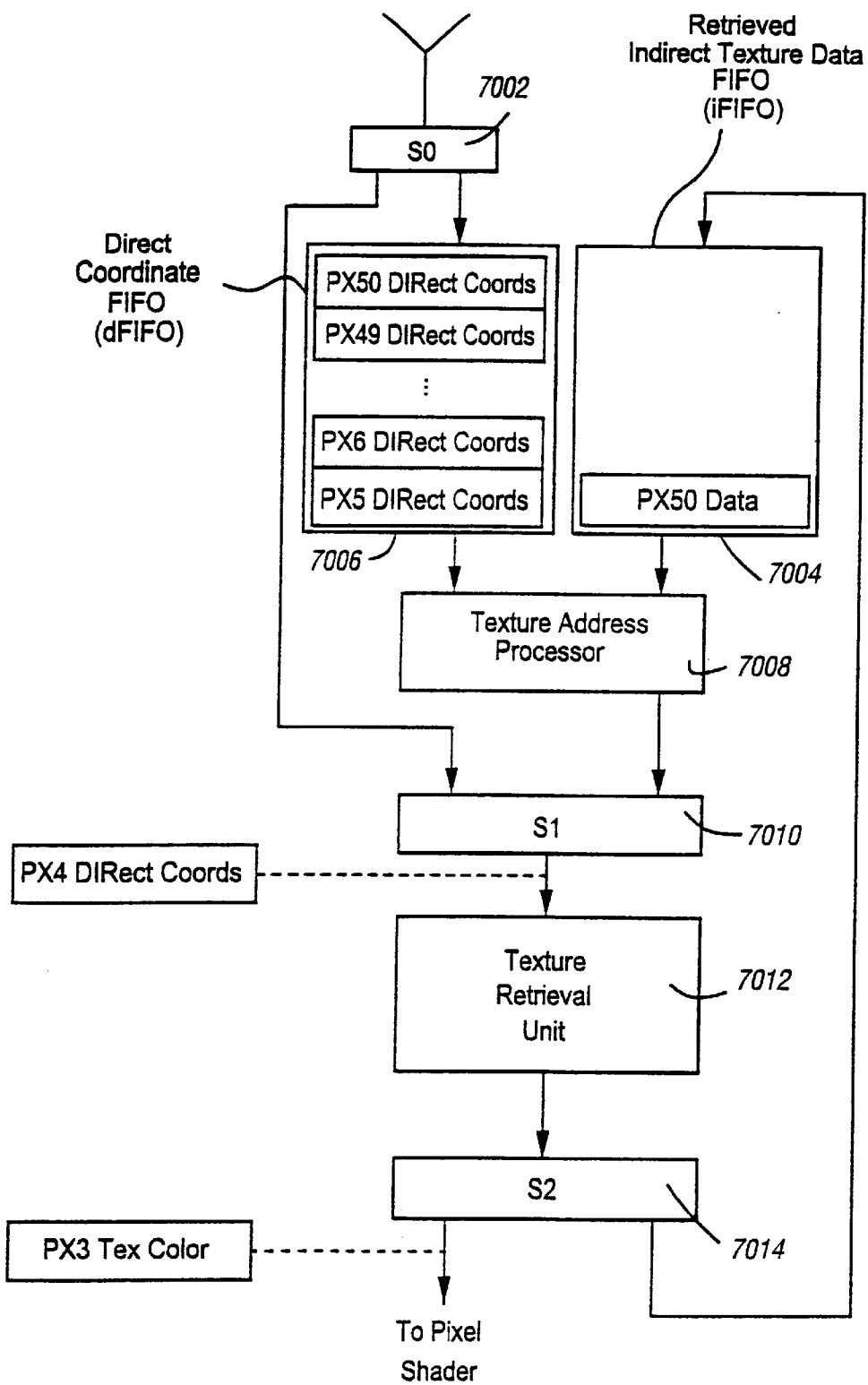
Figure 10K:
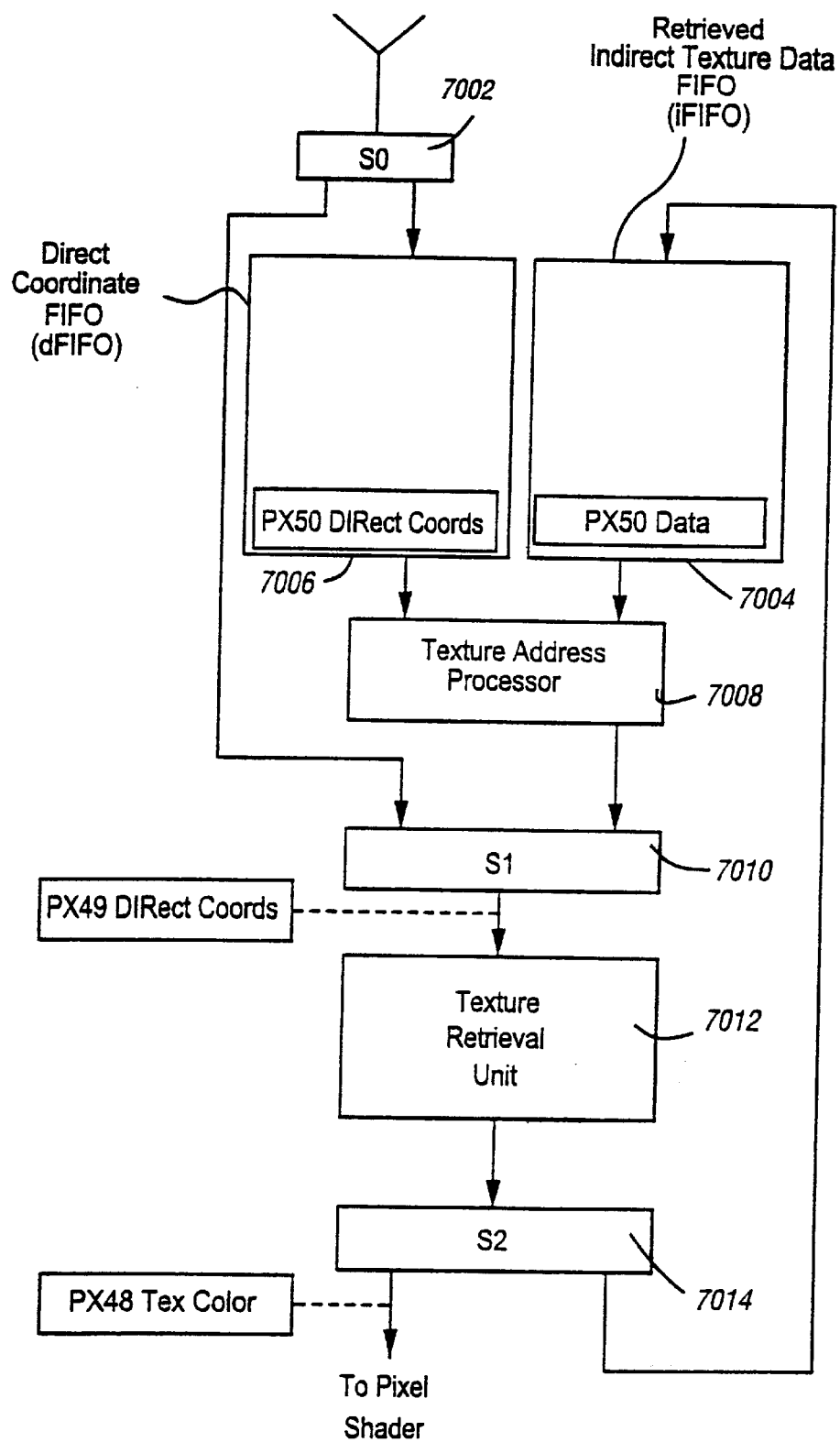
Figure 11:
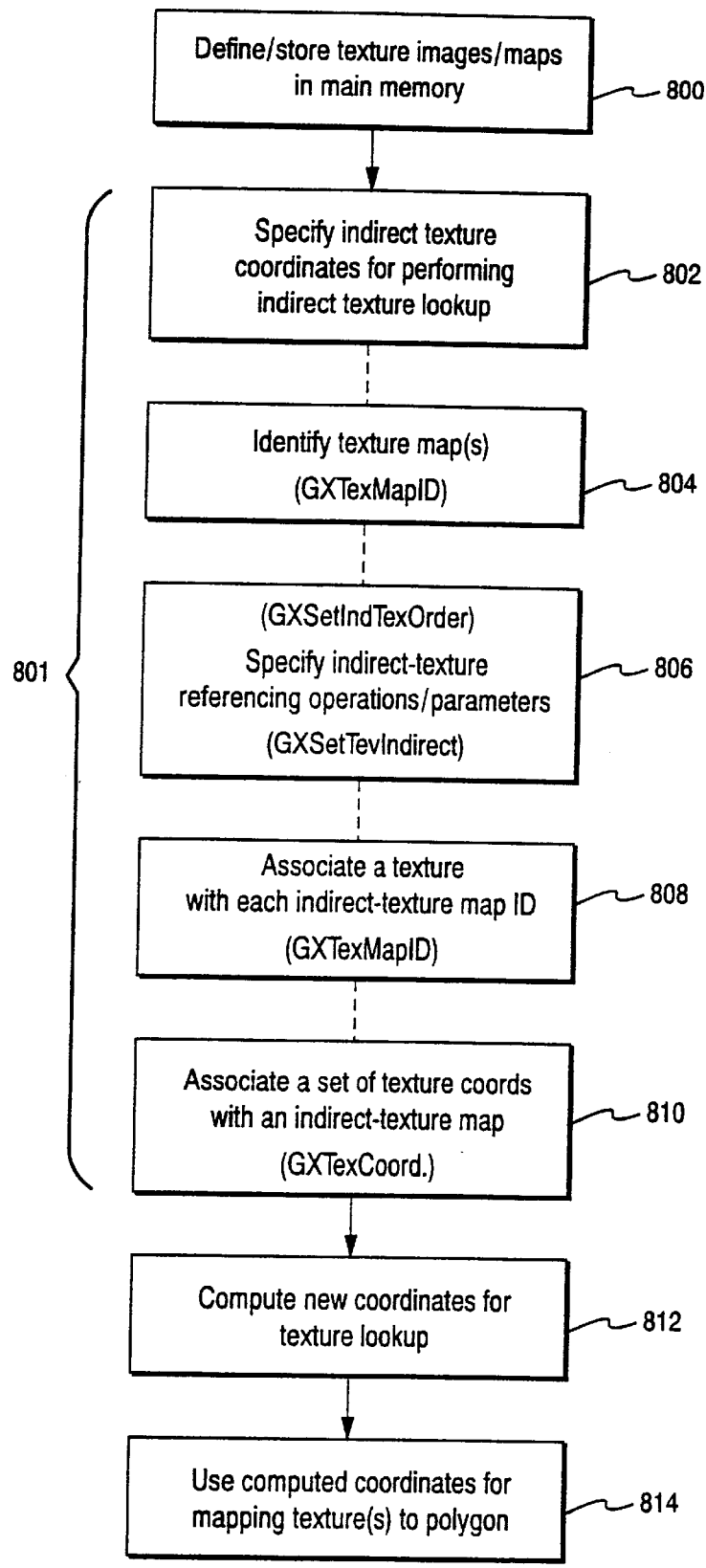
FIG. 11 is a flow chart illustrating example steps for implementing indirect texture processing in accordance with the present invention.
Figure 12:
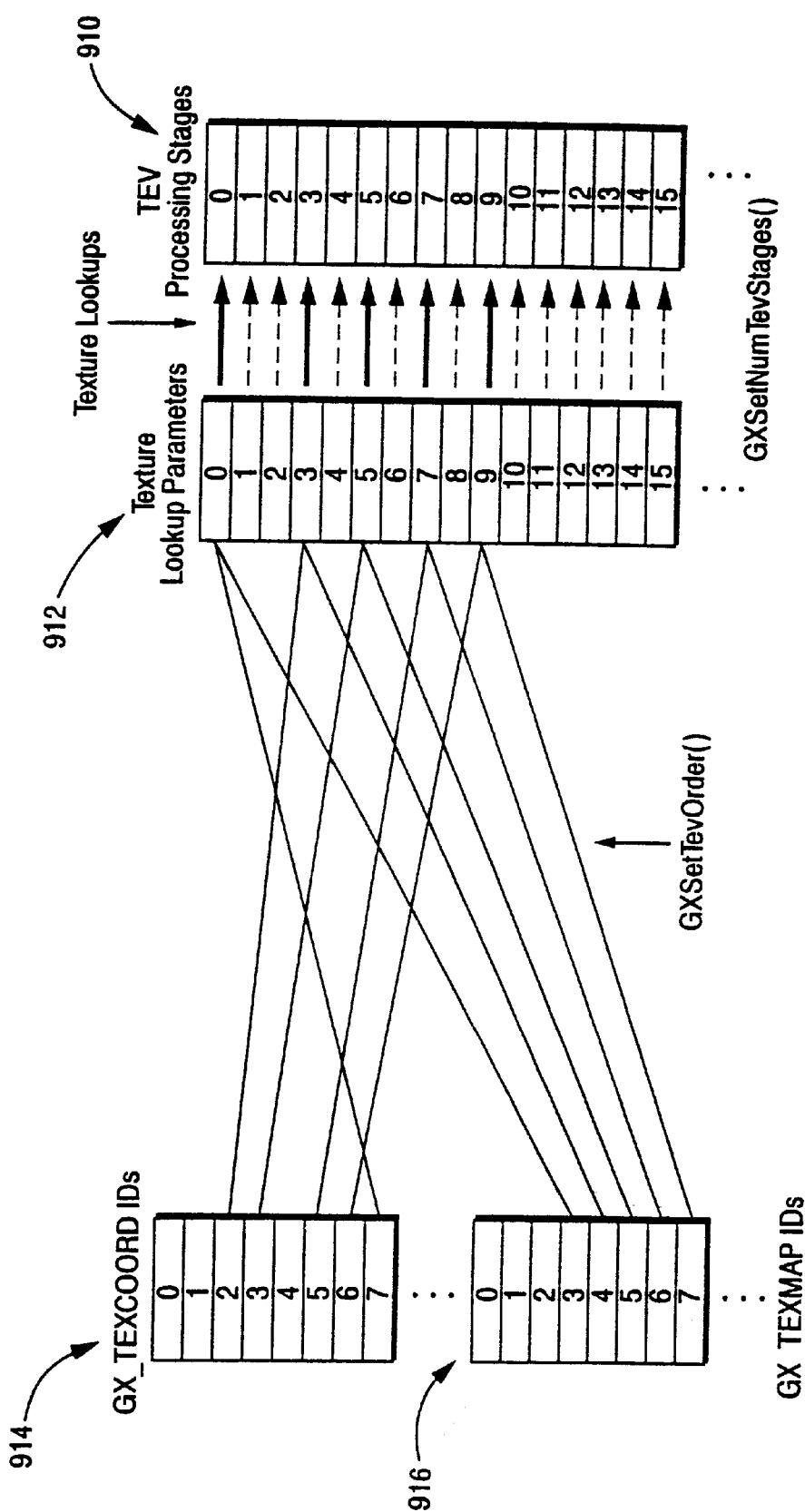
FIG. 12 is a functional operations diagram illustrating an example of regular (non-indirect) texture processing in accordance with the present invention.
Figure 13:
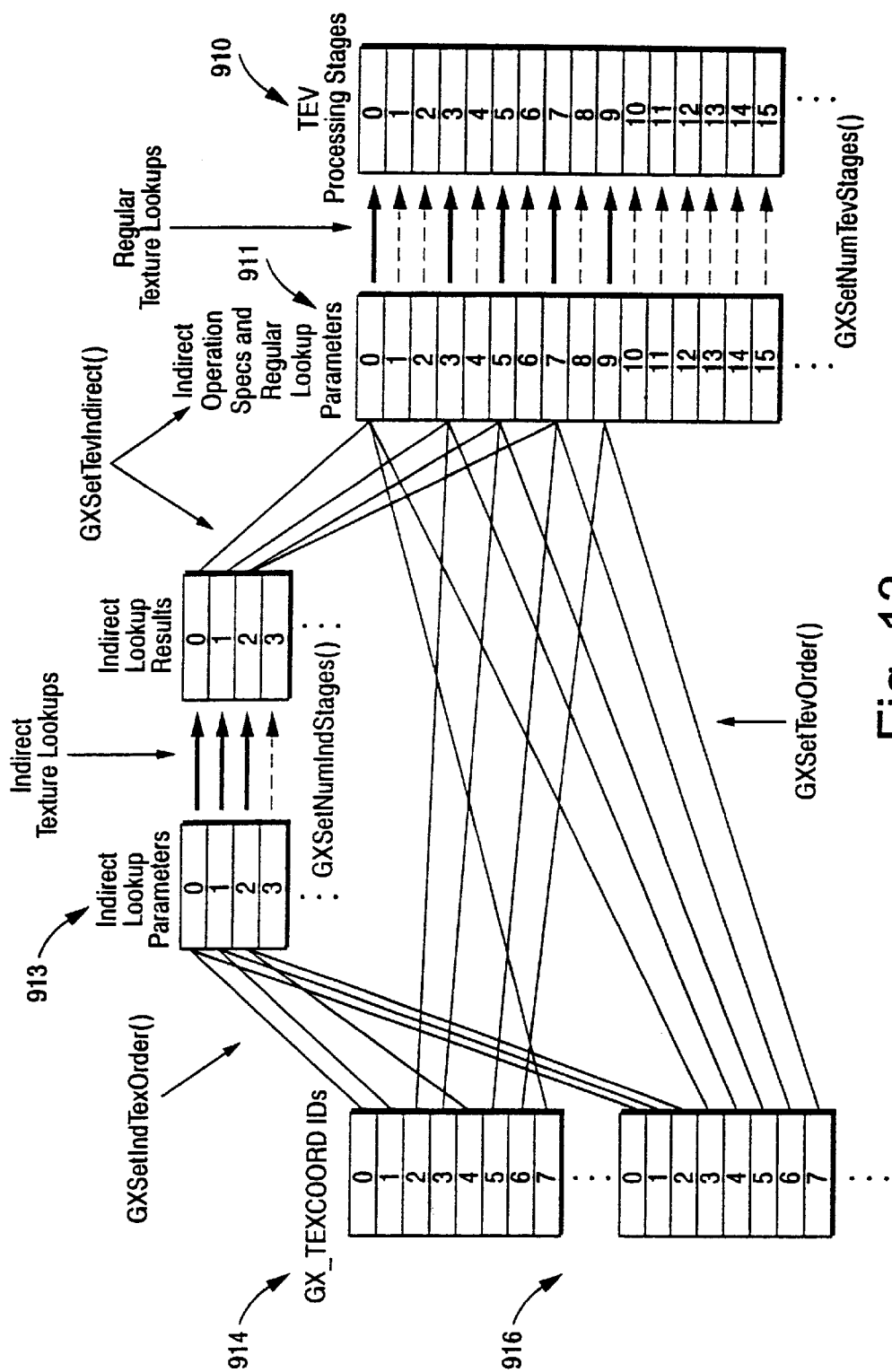
FIG. 13 is a functional operations diagram illustrating an example of both regular (non-indirect) and indirect texture processing in accordance with the present invention.
Figure 14:
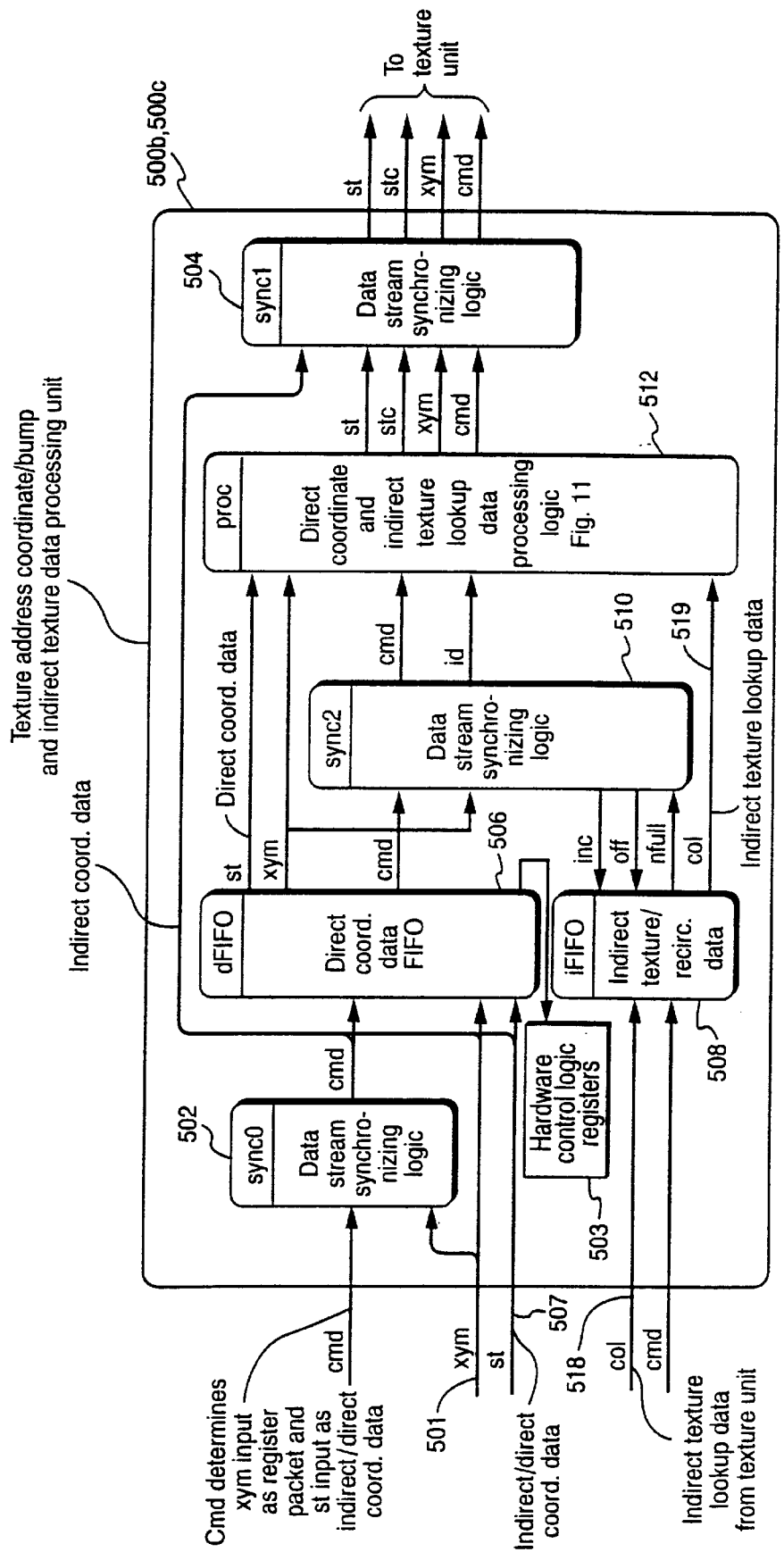
FIG. 14 is a block diagram showing a detailed example of the texture coordinate/bump processing unit shown in FIG. 5.
Figure 15:
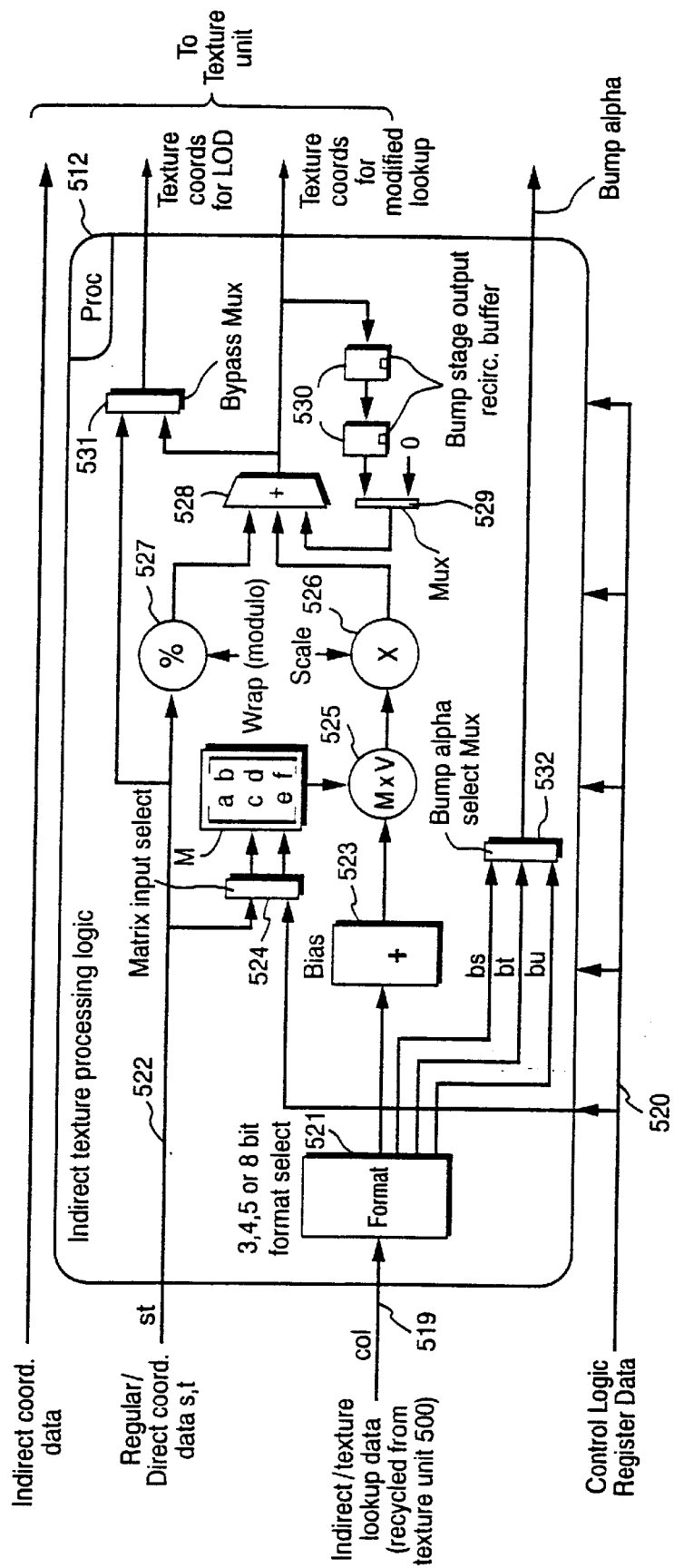
FIG. 15 is a block diagram showing a detailed example of the indirect texture lookup data/coordinate processing logic (proc) shown in FIG. 14.

As shown in FIGS. 7–9, one or more graphics API functions are preferably used to set up and initiate indirect texture look up operations and indirect texture processing. Example API functions for setting up indirect texture operations and parameters for performing Indirect texture tiling and pseudo-3D texture tiling, as described above, may be defined as follows:

GXSetTevIndTile

This function may be used to implemented tiled texturing using indirect textures. Note that the regular texture map only specifies tile definitions. The actual number of texels to be applied to the polygon is a function of the base tile size and the size of the indirect map. In order to set the proper texture coordinate scale, one must call GXSetTexCoordScaleManually. One can also use GXSetIndTexScale in order to use the same texcoord for the indirect stage as the regular TEV stage.

Example Arguments

| | |
|---|---|
| tev_stage | The TEV stage that is being affected. |
| ind_stage | The indirect stage results to use with this TEV stage. |
| tilesize_s | Indicates the size of the tile in the S dimension. |
| tilesize_t | Indicates the size of the tile in the T dimension. |
| Tilespacing_s | Indicates the spacing of the tiles in the S dimension. |
| Tilespacing_t | Indicates the spacing of the tiles in the T dimension. |
| Format | Indicates which indirect texture format to use. |
| matrix_sel | Indicates which indirect matrix and scale value to multiply the offsets with. |
| bias_sel | Indicates the tile stacking direction for pseudo-3D textures. |
| alpha_sel | Indicates which offset component will supply the indirect "bump" alpha, if any (for pseudo-3D textures). |

Example Usage

```
void GXSetTevIndTile(   GXTevStageID tev_stage,
                        GXIndTexStageID ind_stage,
                        u16 tilesize_s,
                        u16 tilesize_t,
                        u16 tilespacing_s,
                        u16 tilespacing_t,
                        GXIndTexFormat format,
                        GXIndTexMtxID matrix_sel,
                        GXIndTexBiasSel bias_sel,
                        GXIndTexAlphaSel alpha_sel);
```

The above function can be used to specify the indirect texture tiling method or the pseudo-3D texture tiling method described above. It is noted that one can specify tile size and spacing separately. An exemplary reason for using spacing which is larger than the tile size is to allow borders for mipmapping purposes. depending upon the height of the mipmap stack, texels outside of the tile area may be included in the filtering calculations for mipmapping. This function will set up the matrix and scale value appropriately based upon the given inputs; one need only specify which matrix slot to use. The biasSel and alphaSel parameters are used only for pseudo-3D lookups. They are set to GX_ITB_ NONE and GX_ITBA_OFF (respectively) for normal 2D tiling. It is noted that texture tiling can take advantage of using the same texture coordinates for the indirect map and the regular (direct) map. However, the desired scale values for the regular texture coordinates are not directly related to the size of the regular map which contains the tile definitions. Normally, the scale size for a texture coordinate will be set to the size of the map being looked up, with preference to the regular map size if a texture coordinate is being shared. Since with texture tiling, as different scale is needed, the following functions can be use:

GXSetTexCoordScaleManually

Arguments

| GXTexCoordID | TexCoord | //Name of the texcoord being affected |
| GXBool | enable | //GX_True = manual scaling; //GX_False = automatic scaling |
| u16 | ss | //Manual scale value for S dimension |
| u16 | ts | //Manual scale value for T dimension. |

Once GXSetTexCoordScaleManually has been called with enable set to GX_True, the given texture coordinate scale values are fixed until the function is called again. If the function is called with enable set to GX_False, then automatic texture coordinate scaling takes over once again for that texcoord. For texture tiling, the desired texture coordinate scale is the tile size times the size of the indirect map. One then uses GXSetIndTexCoordScale to divide out the tile size for use in accessing the indirect map.

In order to support pseudo-3D texture lookup, one must, in this example, call GXSetTevIndTile for two adjacent TEV stages. The first stage resembles a normal 2D tiling specification. For the second stage, one specifies a bias select and alpha select. The bias is used to select the tile stacking direction. One uses GX_ITB_S when the next tile is offset in the S dimension, and GX_ITB_T when the next tile is offset in the T dimension. One then chooses a bump alpha in order to blend between the tile from the first lookup and the tile from the second lookup. It is noted that in this example, one cannot use the 8-bit format for pseudo-3D textures. Instead, one can use the 3, 4 and 5-bit formats. These formats use a bias value of +1 instead of −128. The +1 bias is used to get the "next" tile in the second stage.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 25A:
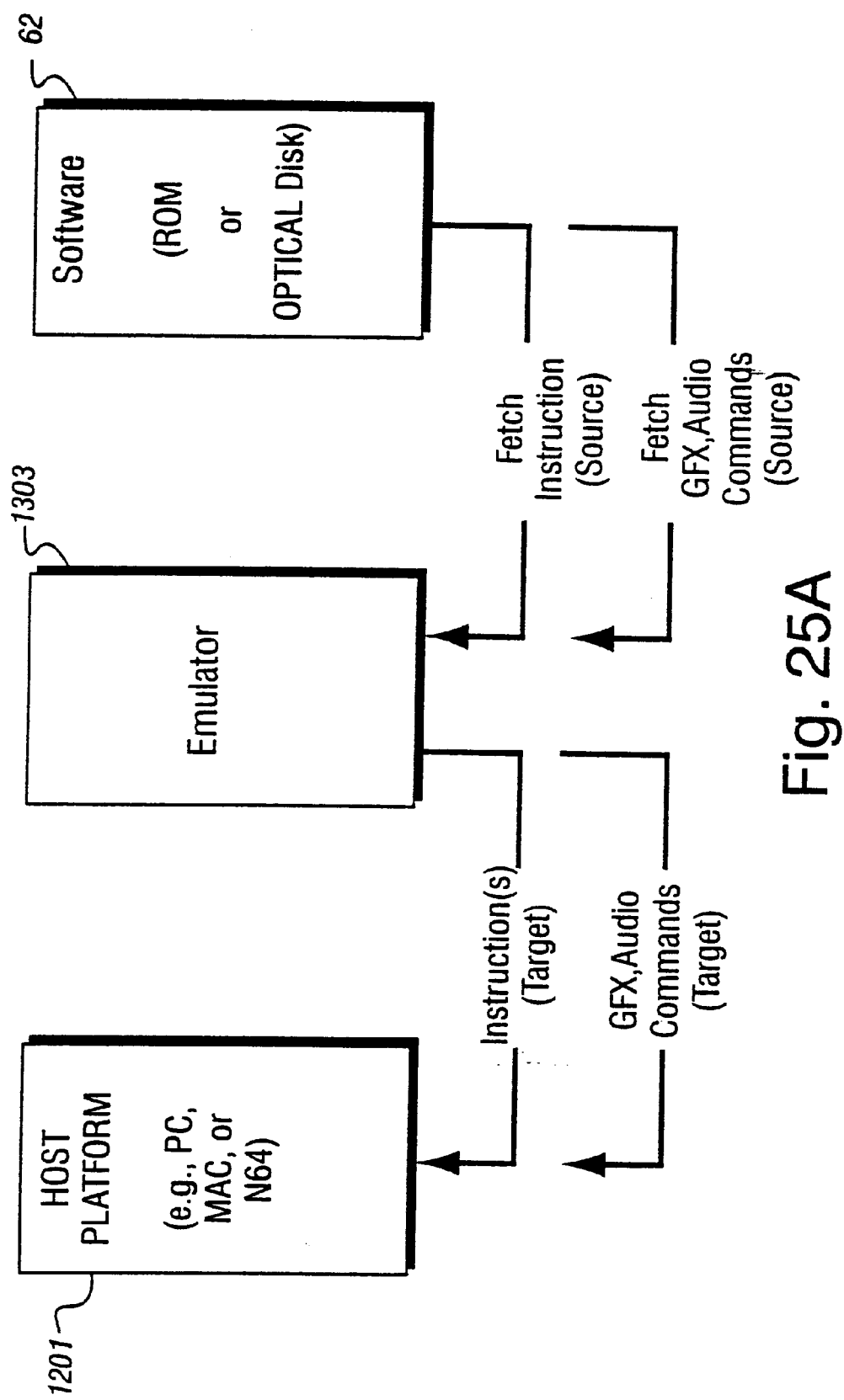
FIGS. 25A and 25B show example alternative compatible implementations.

FIG. 25A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

In the case where particular graphics support hardware within an emulator does not include the example indirect texture referencing features and functions illustrated by FIGS. 7 through 24, the emulator designer has a choice of either:

translating the indirect-texture referencing commands into other graphics API commands the graphics support hardware understands, or implementing indirect-texture referencing in software with a potential corresponding decrease in performance depending upon the speed of the processor, or "stubbing" (i.e., ignoring) the indirect-texture referencing commands to provide a rendered image that does not include effects utilizing indirect-texture referencing.

While the logical diagrams of FIGS. 21 and 24 can be implemented entirely in software, entirely in hardware or by a combination of hardware and software, the preferred embodiment performs most of the calculations in hardware (using bump unit 500b) to obtain increased speed performance and other advantages. Nevertheless, in other implementations (e.g. where a very fast processor is available), some of all of the processing described herein may be implemented in software to provide similar or identical imaging results.

Figure 25B:
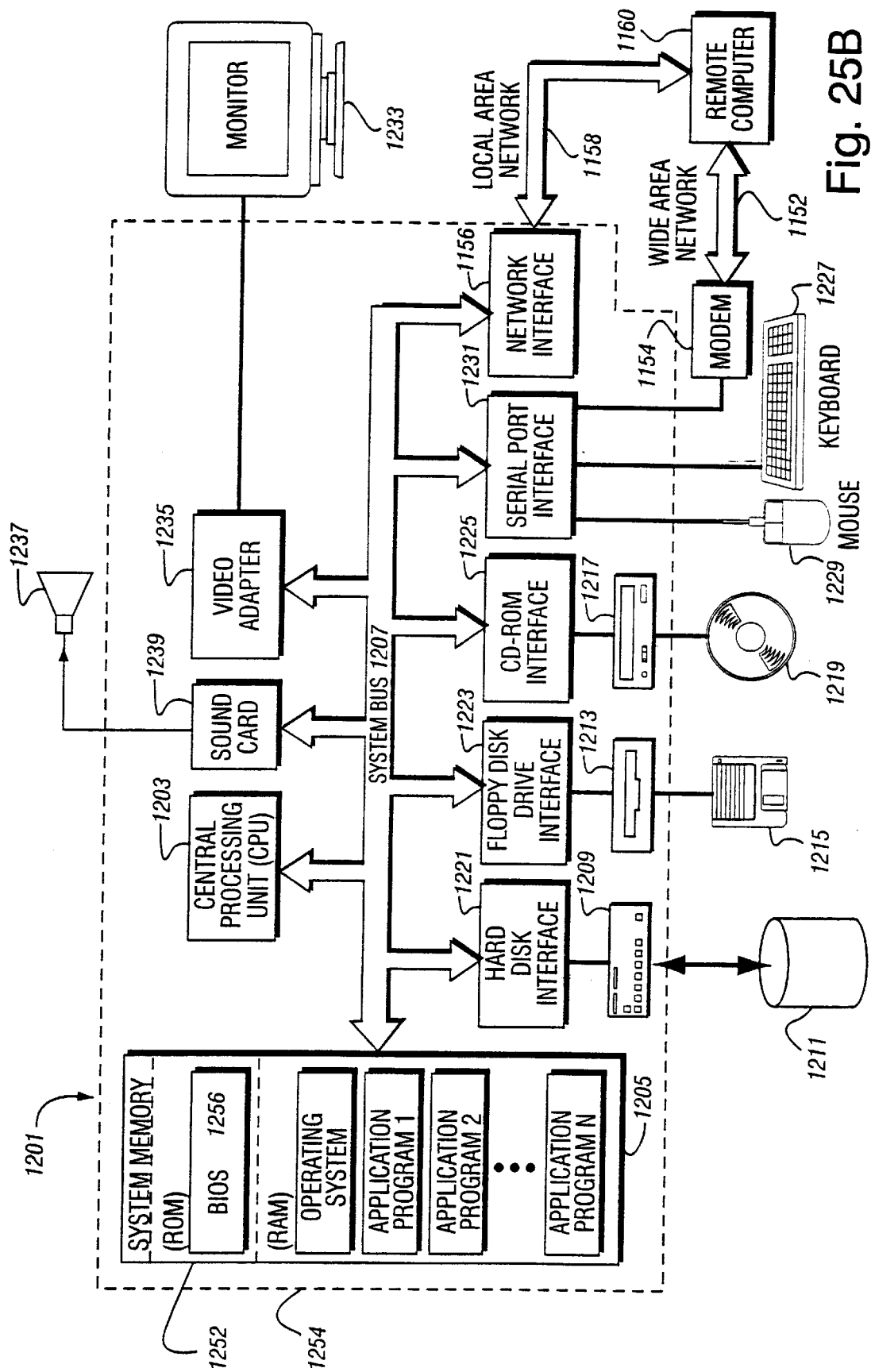

FIG. 25B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A method of texture tiling, comprising;

defining a set of direct texture coordinates;

defining a set of indirect texture coordinates;

using the indirect coordinates to obtain an offset value;

combining the offset value with at least one of the direct texture coordinates to produce a first set of modified texture coordinates;

using the first set of modified texture coordinates to obtain a first texture tile form a tile definitions map;

biasing the offset value;

modifying the direct texture coordinates using the biased offset value;

combining the modified offset value with at least one of the direct texture coordinated of produce a second set of modified texture coordinates;

using the second set of modified texture coordinates to obtain a second texture tile form the tile definitions map; and blending the first texture tile and the second texture tile to produce a synthesized texture tile.

2. The method of claim 1, wherein using the indirect coordinates includes looking up the offset value from an indirect tile index map.

3. The method of claim 1, wherein the indirect texture coordinates are the same as the direct texture coordinates.

4. The method of claim 1, further including using a blending factor when blending which determines a ratio of blend between the first texture tile and the second texture tile.

5. The method of claim 2, further including obtaining the blending factor from the indirect texture index map when performing the looking up step.

6. The method of claim 2, further including defining the tile definitions map as a tile layer definitions stack.

* * * * *